United States Patent
Morooka et al.

(10) Patent No.: US 6,906,869 B2
(45) Date of Patent: Jun. 14, 2005

(54) ZOOM OPTICAL SYSTEM AND CAMERA COMPRISING THE SAME

(75) Inventors: Masaru Morooka, Hachioji (JP); Kazuya Nishimura, Hachioji (JP)

(73) Assignee: Olympus Corporation, Tokyo (JP)

(*) Notice: Subject to any disclaimer, the term of this patent is extended or adjusted under 35 U.S.C. 154(b) by 82 days.

(21) Appl. No.: 10/412,278

(22) Filed: Apr. 14, 2003

(65) Prior Publication Data

US 2003/0210472 A1 Nov. 13, 2003

Related U.S. Application Data

(62) Division of application No. 10/041,766, filed on Jan. 10, 2002, now Pat. No. 6,570,716.

(30) Foreign Application Priority Data

Jan. 11, 2001 (JP) .................................. 2001-003439

(51) Int. Cl.⁷ .............................................. G02B 15/14
(52) U.S. Cl. ...................................... 359/692; 359/691
(58) Field of Search ................................ 359/690–692, 359/683, 687, 688

(56) References Cited

U.S. PATENT DOCUMENTS

| | | | | |
|---|---|---|---|---|
| 5,633,760 A | * | 5/1997 | Shibayama | .................. 359/692 |
| 5,825,557 A | * | 10/1998 | Ohno | .................. 359/692 |
| 6,008,953 A | | 12/1999 | Itoh | |
| 6,072,638 A | | 6/2000 | Enomoto | |
| 6,208,471 B1 | * | 3/2001 | Enomoto et al. | ........... 359/692 |
| 6,268,965 B1 | | 7/2001 | Enomoto | |
| 6,396,643 B1 | * | 5/2002 | Yamanashi | .................. 359/692 |

FOREIGN PATENT DOCUMENTS

| JP | 11-14903 | 1/1999 |
|---|---|---|
| JP | 2000-28921 | 1/2000 |
| JP | 2000-137163 | 5/2000 |

* cited by examiner

*Primary Examiner*—Georgia Epps
*Assistant Examiner*—William Choi
(74) *Attorney, Agent, or Firm*—Pillsbury Winthrop LLP

(57) ABSTRACT

The invention relates to a compact two-group zoom optical system which has an angle of view of 70° or greater at the wide-angle end and satisfactory image-formation capability all over the zoom range while maintaining a zoom ratio of 3 or greater. The zoom optical system comprises a first lens group G1 having positive refracting power and a second lens group G2 having negative refracting power. For zooming from the wide-angle end to the telephoto end, the respective lens groups move toward the object side while the spacing between the first lens group G1 and the second lens group G2 becomes narrow.

18 Claims, 15 Drawing Sheets

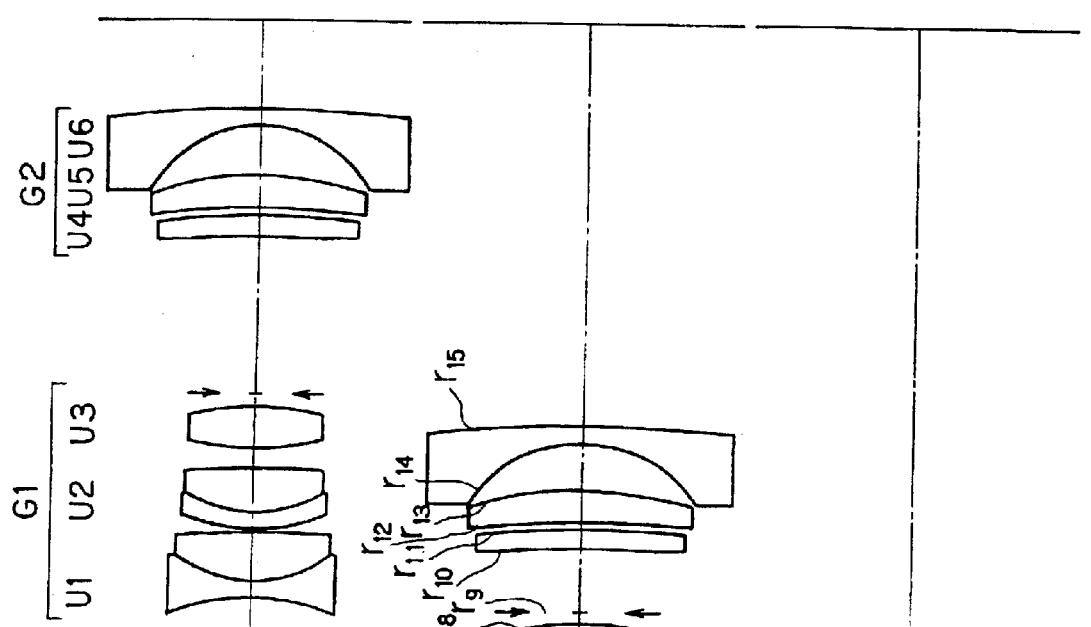
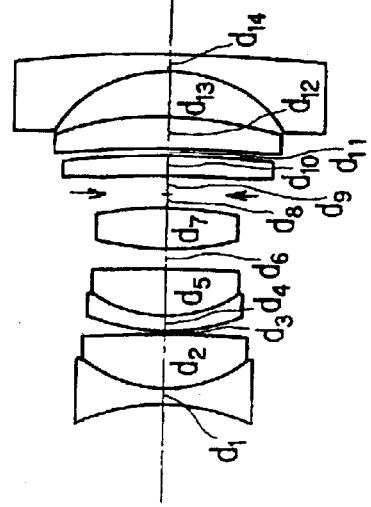
FIG. 1(a)
FIG. 1(b)
FIG. 1(c)

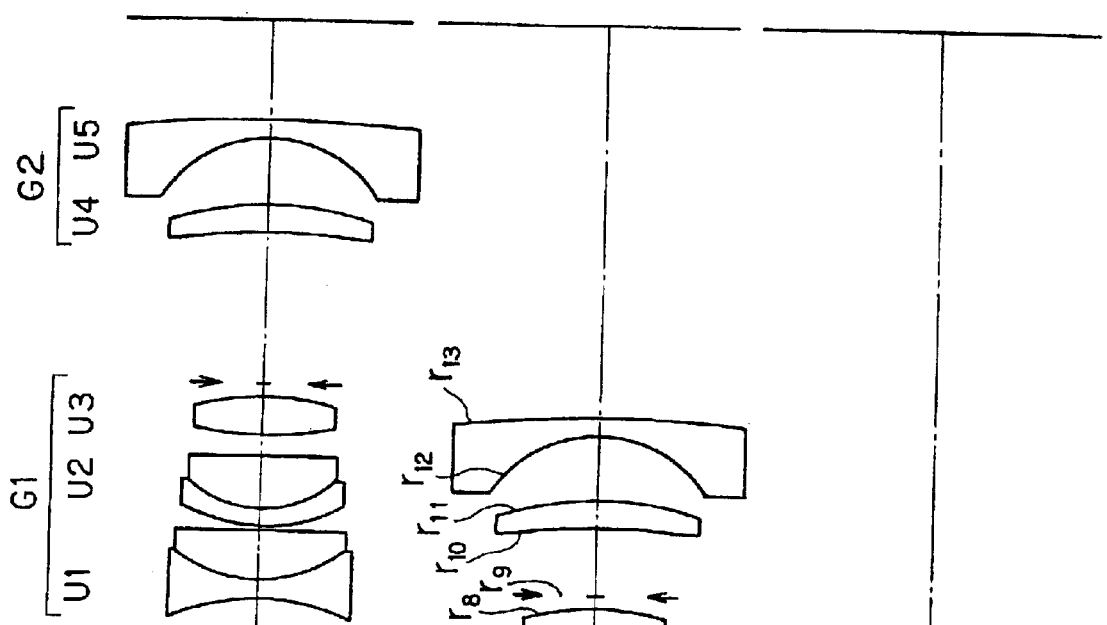
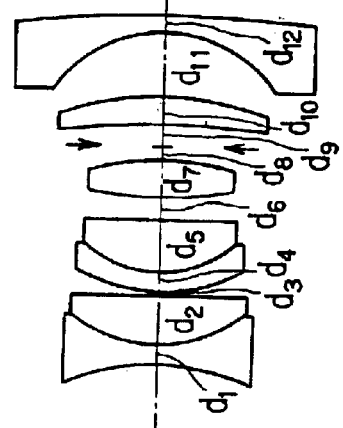
FIG. 3(a)
FIG. 3(b)
FIG. 3(c)

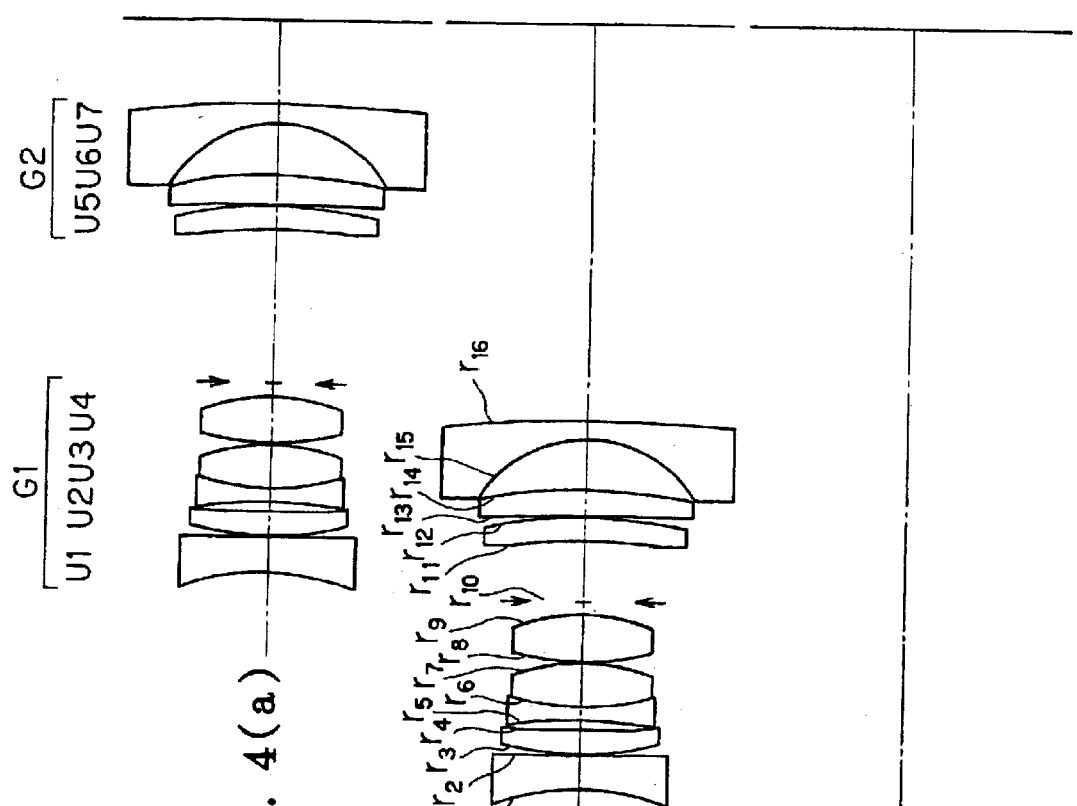
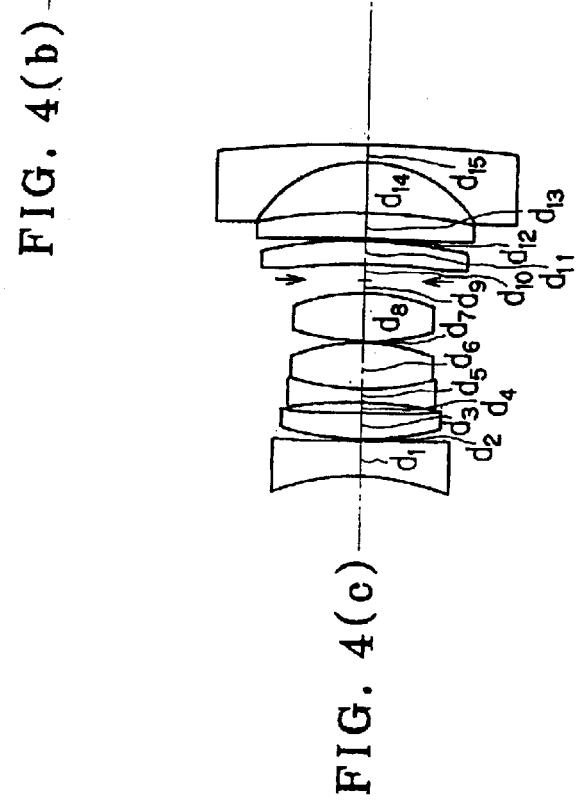
FIG. 4(a)
FIG. 4(b)
FIG. 4(c)

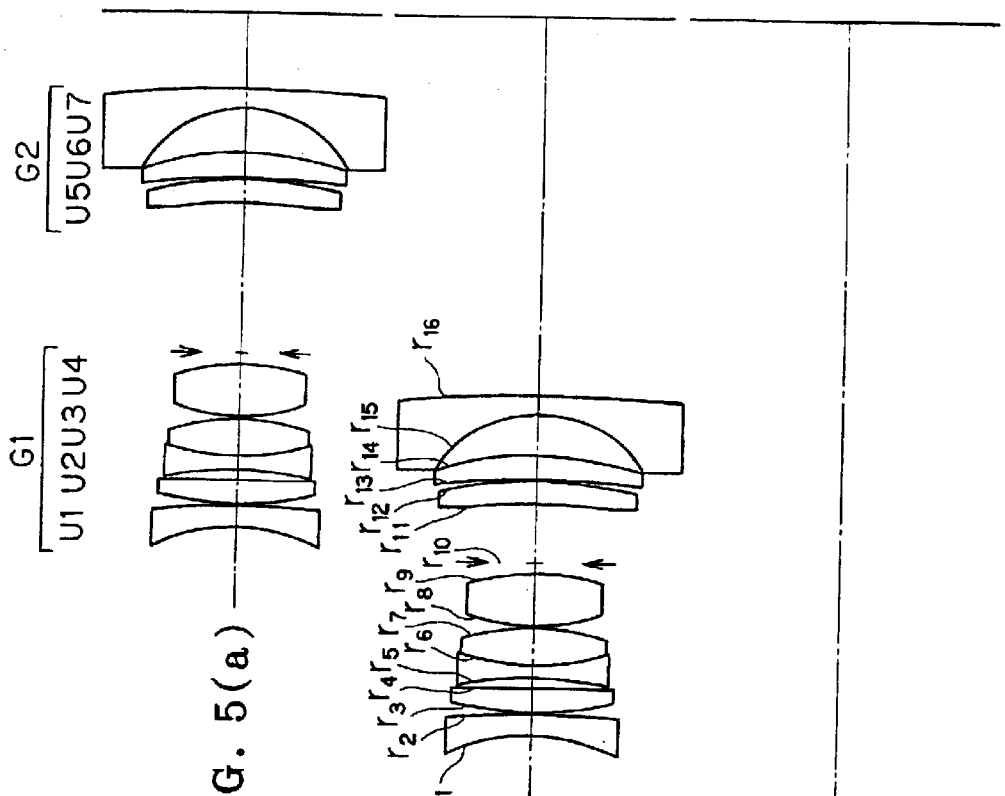
FIG. 5(a)
FIG. 5(b)
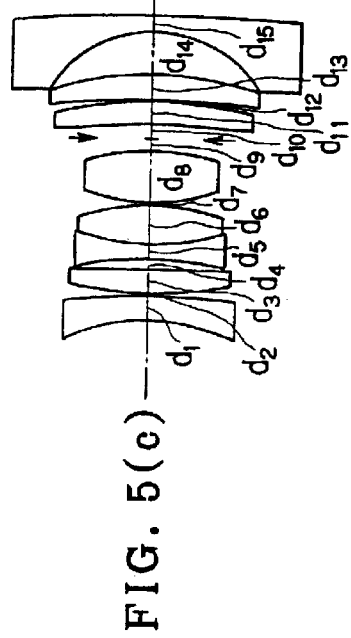
FIG. 5(c)

FIG. 15
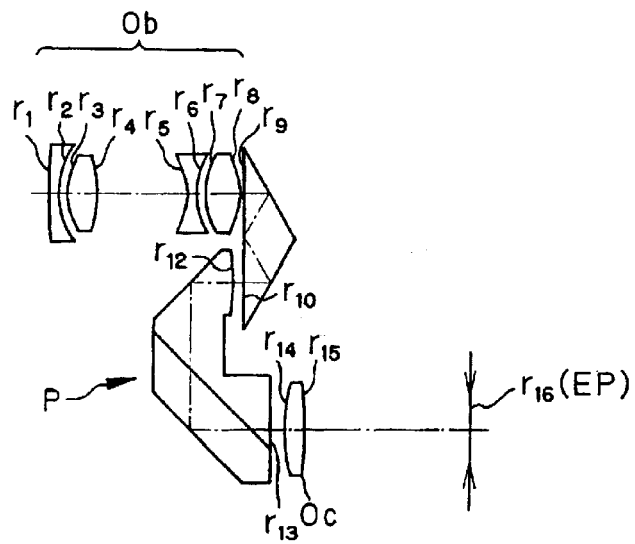
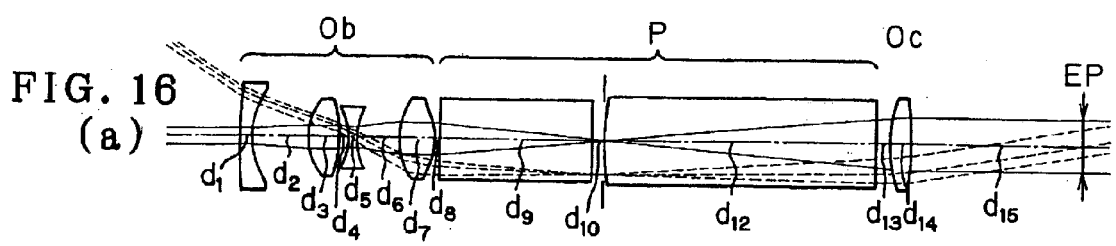
FIG. 16 (a)
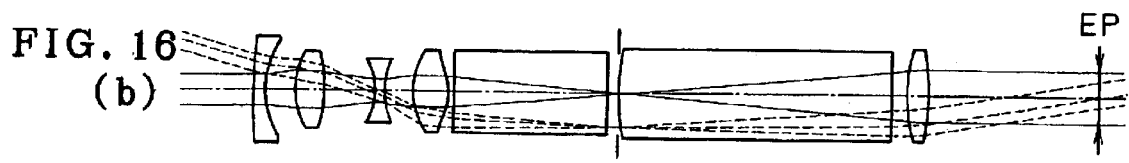
FIG. 16 (b)
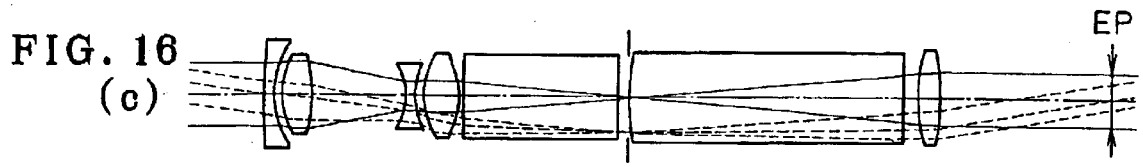
FIG. 16 (c)

ZOOM OPTICAL SYSTEM AND CAMERA COMPRISING THE SAME

CROSS REFERENCE TO RELATED APPLICATIONS

This application is a Divisional Application of U.S. application Ser. No. 10/041,766, filed Jan. 10, 2002 now U.S. Pat. No. 6,570,716, allowed, the specification and drawings of which are incorporated herein by reference.

This application claims benefit of Japanese Application No. 2001-3439 filed in Japan on Jan. 11, 2001, the contents of which are incorporated by this reference.

BACKGROUND OF THE INVENTION

The present invention relates generally to a zoom optical system used with image pickup devices, and more particularly to a zoom optical system for use with photographic cameras, especially lens shutter cameras.

Cameras having zoom lenses are now popular for recent lens shutter cameras, and there are growing demands for cameras equipped with a compact phototaking lens having an increased zoom ratio.

Generally, a zoom optical system having a zoom ratio of about 2 to 3 is constructed in the form of a two-group one consisting of, in order from its object side, a lens group having positive refracting power and a lens group having negative refracting power, and a zoom optical system having a zoom ratio of about 3 to 4.5 is set up in the form of a three-group one consisting of, in order from its object side, a lens group having positive refracting power, a lens group having positive refracting power and a lens group having negative refracting power.

In general, two-group zoom arrangements are used especially for lens shutter cameras targeted at low cost and compactness, because of comprising a simple mechanical mechanism with reduced sensitivities of the adjacent lens groups to decentration.

Some two-group zoom lens systems having a zoom ratio of about 3 are generally designed with an angle of view of about 60° at the wide-angle end. On account of growing needs for scenic shots taken at wider-angle ends, which are a reflection of recent going-abroad booms, and for lens shutter cameras with wide-angle zoom lenses at oversea markets, however, there is an increasing demand for two-group zoom lenses having an angle of view of about 70° or greater at the wide-angle ends and having a zoom ratio of about 3.

With zoom lenses having a zoom ratio of about 3 while maintaining an angle of view of about 70° or greater at the wide-angle ends, however, it is difficult to maintain image-formation capability at the telephoto ends.

Lens arrangements so far proposed to overcome such problems are disclosed in JP-A's 11-14903, 2000-28921 and 2000-137163.

However, the lens arrangements set forth in JP-A's 11-14903 and 2000-137163 have a zoom ratio of as low as 2.8 although the angle of view at the wide-angle ends is of the order of 70° or greater. The lens arrangement of JP-A 2000-28921, too, has an zoom ratio of at most 3 although the angle of view at the wide-angle end is 70° or greater.

SUMMARY OF THE INVENTION

In view of such states of the prior art, an object of the invention is provide a zoom optical system having a wider angle of view at the wide-angle end and an increased zoom ratio, especially a compact two-group zoom optical system capable of maintaining satisfactory image-formation capability all over the zooming range, albeit having an angle of view of 70° or greater at the wide-angle end and a zoom ratio of 3 or greater.

According to the first aspect of the invention designed to achieve this object, there is provided a zoom lens optical system having a zoom ratio of 3 or greater and comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

the first lens group consists of, in order from an object side thereof, a first lens unit (U1) having negative refracting power, a second lens unit (U2) having positive refracting power and a third lens group (U3) having positive refracting power wherein each lens unit consists of a single lens or a cemented lens, and satisfies the following condition:

$$0.35 < f_{G1}/f_{12} < 1.5 \quad (1)$$

where $f_{G1}$ is the focal length of the first lens group, and $f_{12}$ is the focal length of the second lens unit.

According to the second aspect of the invention, there is provided a zoom lens optical system comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

the first lens group consists of, in order from an object side thereof, a first lens unit (U1) having negative refracting power, a second lens unit (U2) having positive refracting power and a third lens unit (U3) having positive refracting power wherein each lens unit consists of a single lens or a doublet, while the following conditions are satisfied:

$$0.8 < |f_{G1}/f_{11}| < 3 \quad (2)$$

$$0.35 < f_{G1}/f_{12} < 3 \quad (3)$$

$$0.8 < f_{G1}/f_{13} < 3 \quad (4)$$

where $f_{G1}$ is the focal length of the first lens group, $f_{11}$ is the focal length of the first lens unit, $f_{12}$ is the focal length of the second lens unit, and $f_{13}$ is the focal length of the third lens unit.

Preferably in the first or second aspect of the invention, the surface, located nearest to the object side, of the first lens unit in the first lens group is concave on the object side.

Preferably in the first or second aspect of the invention, the second lens unit in the first lens group is a doublet consisting of, in order from an object side thereof, a negative meniscus lens convex on an object side thereof and a positive lens.

Preferably, the second lens unit in the first lens group satisfies the following condition:

$$30 < \nu_{12P} - \nu_{12N} < 50 \quad (5)$$

where $\nu_{12P}$ is the Abbe's number of the positive lens in the second lens unit, and $\nu_{12N}$ is the Abbe's number of the negative lens in the second lens unit.

Preferably in the first, second and subsequent aspects of the invention, the third lens unit in the first lens group comprises at least one aspheric surface that satisfies the following condition:

$$0<|\Delta A/ST|<4.5\times10^{-2} \quad (6)$$

where ΔA is the amount of the aspheric surface at a height from an optical system to 0.8 times the radius of an aperture stop, and ST is the radius of the aperture stop at a telephoto end.

According to the third aspect of the invention, there is provided a zoom lens optical system comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

the first lens group consists of, in order from an object side thereof, a first lens unit (U1) having negative refracting power, a second lens unit (U2) having positive refracting power and a third lens unit (U3) having positive refracting power wherein the first lens unit is a doublet consisting of a negative lens and a positive lens in order from an object side thereof, and the second lens unit is a doublet consisting of a negative lens and a positive lens in order from an object side thereof.

According to the fourth aspect of the invention, there is provided a zoom lens optical system having a zoom ratio of 3 or greater and comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

the first lens group consists of, in order from an object side thereof, a first lens unit (U1) that has negative refracting power and in which the surface located nearest to an object side thereof is concave on the object side, a second lens unit (U2) having positive refracting power, a third lens unit (U3) having negative refracting power and a fourth lens unit (U4) having positive refracting power, wherein each lens unit in the first lens group consists of a single lens or a doublet.

According to the fifth aspect of the invention, there is provided a zoom lens optical system comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

the first lens group consists of, in order from an object side thereof, a first lens unit (U1) that has negative refracting power and in which the surface located nearest to an object side thereof is concave on the object side, a second lens unit (U2) having positive refracting power, a third lens unit (U3) having negative or positive refracting power and a fourth lens unit (U4) having positive refracting power, wherein the respective lens units in the first lens group consist of a single lens or a doublet and satisfy the following conditions:

$$0.5<|f_{G1}/f_{11}|<3 \quad (7)$$

$$-0.4<f_{G1}/f_{13}<0.1 \quad (8)$$

where $f_{G1}$ is the focal length of the first lens group, $f_{11}$ is the focal length of the first lens unit, and $f_{13}$ is the focal length of the third lens unit.

Preferably in the fourth or fifth aspect of the invention, at least one surface of the second or fourth lens unit in the first lens group is defined by an aspheric surface.

According to the sixth aspect of the invention, there is provided a zoom lens optical system comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

the first lens group consists of, in order from an object side thereof, a first lens unit (U1) that has negative refracting power and in which the surface located nearest to an object side thereof is concave on the object side, a second lens unit (U2) that has positive refracting power, comprises at least one aspheric surface and is formed of a plastic material, a third lens unit (U3) having positive refracting power and a fourth lens unit (U4) having positive refracting power, wherein the respective lens units in the first lens group consist of a single lens or a doublet and satisfy the following conditions:

$$200\times10^{-5}<|\Delta N_P| \quad (9)$$

$$0<|f_{G1}/f_{12}|<0.25 \quad (10)$$

$$0<f_{G1}/f_{13}<0.5 \quad (11)$$

where $\Delta N_P$ is the amount of change in the refractive index ($n_d$) of the plastic material with respect to a d-line wavelength of 587.56 nm due to a temperature change of −10° C. to 40° C., $f_{G1}$ is the focal length of the first lens group, $f_{12}$ is the focal length of the second lens unit, and $f_{13}$ is the focal length of the third lens unit.

According to the seventh aspect of the invention, there is provided a zoom lens optical system comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

the first lens group consists of, in order from an object side thereof, a first lens unit (U1) that has negative refracting power and in which the surface located nearest to an object side thereof is concave on the object side, a second lens unit (U2) that has positive refracting power and is in a meniscus form convex on an object side thereof, a third lens unit (U3) that is a doublet consisting of a negative lens and a positive lens in order from an object side thereof and has negative or positive refracting power and a fourth lens unit (U4) having positive refracting power.

Preferably in any one of the zoom optical systems of the invention, the zoom ratio should be as high as 3 or greater, and especially as high as 3.3 or greater.

Preferably in any one of the zoom optical systems of the invention, the angle of view at the wide-angle end should be 70° or greater.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1(a) to 1(c) are sectional lens arrangement views of Example 1 of the zoom optical system according to the invention.

FIGS. 3(a) to 3(c) are sectional lens arrangement views of Example 6 of the zoom optical system according to the invention.

FIGS. 4(a) to 4(c) are sectional lens arrangement views of Example 7 of the zoom optical system according to the invention.

FIGS. 5(a) to 5(c) are sectional lens arrangement views of Example 9 of the zoom optical system according to the invention.

FIG. 15 is a sectional view along horizontal, which is illustrative of one example of a finder used with such a compact camera as shown in FIGS. 13 and 14.

FIGS. 16(a) to 16(c) are exploded views for the optical path through the finder of FIG. 15.

DESCRIPTION OF THE PREFERRED EMBODIMENTS

Figure 2A:
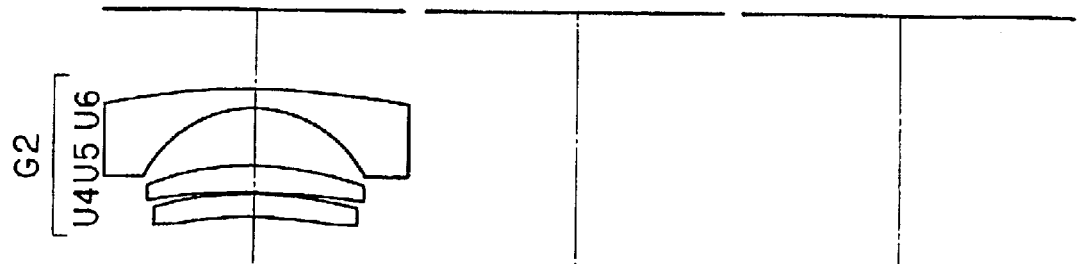
FIGS. 2(a) to 2(c) are sectional lens arrangement views of Example 5 of the zoom optical system according to the invention.

In what follows, the 1st to 7th aspects of the zoom optical system of the invention will be first explained, and several Examples of the zoom optical system of the invention will be then given.

First Aspect of the Invention

Designed to operate in a simple two-group zoom mode, the first aspect of the zoom optical system of the invention comprises, in order from an object side thereof, a first lens group having positive refracting power and a second lens group having negative refracting power. For zooming from the wide-angle end to the telephoto end of the optical system, the respective lens groups move toward the object side with a decreasing spacing between the first and the second lens group.

Basically, the first lens group is of the retrofocus type composed of, in order from the object side thereof, a front lens unit (UF) having negative refracting power and a rear lens unit (UR) having positive refracting power. It is thus possible to bring the principal point position of the first lens group close to an image plane, thereby ensuring an ample back focus at the wide-angle end.

Preferably for the two-group zoom mode, aberrations produced at each lens group should be reduced or limited. To this end, the first lens group is so designed that aberrations produced at the negative lens unit (UF) cancel out aberrations produced at the positive lens unit (UR), whereby aberrations can be well corrected throughout the optical system.

When the angle of view at the wide-angle end exceeds 70°, however, it is difficult to ensure any desired back focus because the spacing between the negative first lens group and the positive second lens group becomes wide. In the invention, accordingly, the back focus is ensured by making stronger the refracting power of the negative lens unit (UF) in the first lens group.

With this arrangement, however, the refracting power of the positive lens unit (UR) in the first lens group, too, becomes relatively strong and so spherical aberrations and coma occurring at this lens unit become large at the telephoto end. To cancel out such aberrations, it is required to produce large aberrations at the negative lens unit (UF), resulting in a problem that the sensitivities of the negative lens unit (UF) and positive lens unit (UR) to decentration become high. In addition, at a zoom ratio of 3 or greater as in the invention, aberrations too large for correction at the negative lens unit (UF) occur at the positive lens unit (UR).

According to the invention, this problem is solved by dividing the positive lens unit (UR) for producing large aberrations into two positive lens subunits. With this arrangement, the aberrations occurring at the positive lens unit (UR) are allocated to the two lens subunits and each lens subunit is allowed to have some long focal length, so that the total amount of aberrations produced at the positive lens unit (UR) can be reduced.

It is therefore easy to achieve a zoom ratio of 3 or greater while the angle of view at the wide-angle is set at 70° or greater.

In the invention, the first lens group is thus composed of, in order from its object side, a first lens unit (U1) having negative refracting power, a second lens unit (U2) having positive refracting power and a third lens unit (U3) having positive refracting power, three lens units in all. Each lens unit is composed of a single lens or a doublet for correction of chromatic aberrations. The first lens group is of a simple construction composed of three independent lens units with no air space between them, so that improved assembly capabilities are achieved.

In the first aspect of the invention, condition (1) should be satisfied to slim down an associated camera and ensure satisfactory performance all over the zoom range.

In the invention, the space between the principal points of the negative and positive lens units is narrowed by allowing the negative first lens unit (U1) in the first lens group to have a relatively short focal length and the positive second and third lens units (U2, U3) to have a short focal length, accordingly. Thus, the principal point of the first lens group can be brought closer to the image plane side, so that the desired back focus can be easily ensured.

However, when the focal lengths of the positive second and third lens units (U2, U3) are shortened to ensure some back focus, it is difficult to make correction for aberrations at the first lens group, because spherical aberrations and coma at the positive second and third units (U2, U3) become larger at the telephoto end. Here, if the focal length of the positive second lens unit (U2) is properly determined according to condition (1), aberrations occurring within the positive lens unit (UR) can then be properly reduced so that correction of aberrations within the first lens group can be well made.

When the lower limit of 0.35 to condition (1) is not reached, the focal length of the positive second lens unit (U2) becomes too long to ensure the necessary back focus at the wide-angle end. When the upper limit of 1.5 to condition (1) is exceeded or the focal length of the positive second lens unit (U2) becomes short, spherical aberrations and coma occurring at the positive lens unit become too large at the telephoto end to ensure satisfactory performance all over the zoom range.

Second Aspect of the Invention

Designed to operate in a simple two-group zoom mode, the second aspect of the zoom optical system of the invention comprises, in order from an object side thereof, a first lens group having positive refracting power and a second lens group having negative refracting power. For zooming from the wide-angle end to the telephoto end of the optical system, the respective lens groups move toward the object side with a decreasing spacing between the first and the second lens group.

Basically, the first lens group is of the retrofocus type composed of, in order from an object side thereof, a front lens unit (UF) having negative refracting power and a rear lens unit (UR) having positive refracting power. It is thus possible to bring the principal point position of the first lens group close to an image plane, thereby ensuring an ample back focus at the wide-angle end.

Preferably for the two-group zoom mode, aberrations produced at each lens group should be reduced or limited. To this end, the first lens group is so designed that aberrations produced at the negative lens unit (UF) cancel out aberrations produced at the positive lens unit (UR), whereby aberrations can be well corrected throughout the optical system.

When the angle of view at the wide-angle end exceeds 70°, however, it is difficult to ensure any desired back focus because the spacing between the negative first lens group and the positive second lens group becomes wide.

In the invention, accordingly, the back focus is ensured by making stronger the refracting power of the negative lens unit (UF) in the first lens group.

With this arrangement, however, the refracting power of the positive lens unit (UR) in the first lens group, too, becomes relatively strong and so spherical aberrations and coma occurring at this lens unit become large at the telephoto end. To cancel out such aberrations, it is required to produce large aberrations at the negative lens unit (UF), resulting in a problem that the sensitivities of the negative lens unit (UF) and positive lens unit (UR) to decentration become high.

In addition, at a zoom ratio of 3 or greater as in the invention, aberrations too large for correction at the negative lens unit (UF) occur at the positive lens unit (UR).

According to the invention, this problem is solved by dividing the positive lens unit (UR) for producing large aberrations into two positive lens subunits. With this arrangement, the aberrations occurring at the positive lens unit (UR) are allocated to the two lens subunits and each lens subunit is allowed to have some long focal length, so that the total amount of aberrations produced at the positive lens unit (UR) can be reduced.

It is therefore easy to achieve a zoom ratio of 3 or greater while the angle of view at the wide-angle is set at 70° or greater.

In the invention, the first lens group is thus composed of, in order from its object side, a first lens unit (U1) having negative refracting power, a second lens unit (U2) having positive refracting power and a third lens unit (U3) having positive refracting power, three lens units in all. Each lens unit is composed of a single lens or a doublet for correction of chromatic aberrations. The first lens group is of a simple construction composed of three independent lens units with no air space between them, so that improved assembly capabilities are achieved.

In the second aspect of the invention, conditions (2) to (4) should be satisfied to slim down an associated camera and ensure satisfactory performance all over the zoom range.

In the invention, the space between the principal points of the negative and positive lens units is narrowed by allowing the negative first lens unit (U1) in the first lens group to have a relatively short focal length and the positive second and third lens units (U2, U3) to have a short focal length, accordingly. Thus, the principal point of the first lens group can be brought closer to the image plane side, so that the desired back focus can be easily ensured.

Condition (2) is provided to properly determine the focal length of the negative first lens unit (U1). When the lower limit of 0.8 to condition (2) is not reached, the focal length of the negative first lens unit (U1) is becomes too long to ensure the necessary back focus at the wide-angle end, resulting in an increase in the lens diameter of the second lens group and, hence, an increase in the size of an associated camera. Exceeding the upper limit of 3 to condition (2) causes the focal length of the negative first lens unit (U1) to become short. Consequently, the back focus may become long, but the overall lens length becomes long all over the zoom range and at the telephoto end in particular, resulting in a failure in slimming down the camera.

Some back focus may be ensured by making the focal lengths of the positive second and third lens units (U2, U3) relatively short. However, this causes spherical aberrations and coma at the positive lens unit to become larger at the telephoto end, and so it is difficult to make correction for aberrations at the first lens group. Here, if the focal lengths of the positive second and third lens units (U2, U3) are properly determined according to conditions (3) and (4), it is then possible to make satisfactory correction for aberrations at the first lens group, because the desired back focus is so ensured at the wide-angle end that aberrations can be well corrected within the first lens group.

When the lower limits of 0.35 and 0.8 to conditions (3) and (4), respectively, are not reached, the focal lengths of the positive second and third lens units (U2, U3) become too long to ensure the necessary back focus at the wide-angle end. When the upper limits of 3 to conditions (3) and (4) are exceeded or the focal lengths of the positive second and third lens units (U2, U3) become short, spherical aberrations and coma occurring at the positive lens units become large at the telephoto end with the result that any satisfactory performance cannot be ensured all over the zoom range.

Preferably in the first or second aspect of the invention, the surface located nearest to the object side in the negative first lens unit (U1) should be concave on the object side. At the angle of view of 70° or greater at the wide-angle end as in the invention, large positive distortion occurs. If, in the first lens unit (U1), the surface located nearest to the object side is concave on the object side, then such large positive distortion can be canceled out by large negative distortion produced at that surface. It is thus possible to reduce distortion at the wide-angle end.

Preferably in the first or second aspect of the invention, the positive second lens unit (U2) in the first lens group should be a doublet consisting of, in order from its object side, a negative meniscus lens convex on the object side and a positive lens.

In the invention, the focal length of the positive second lens unit (U2) is designed to have a relatively short focal length. Accordingly, the longer the focal length at the telephoto end, the larger the spherical aberrations and coma produced there become. Here, if the second lens unit (U2) is constructed using such a doublet as mentioned above, then its cemented surface is defined by a surface convex on the object side. This surface produces aberrations that can cancel out the spherical aberrations and coma, so that the spherical aberrations and coma can be well corrected at the positive second lens unit (U2). In addition, when the positive second lens unit (U2) is constructed of the doublet, longitudinal chromatic aberration at the telephoto end can be well corrected.

At a zoom ratio of 3 or greater as in the invention, it is difficult to make satisfactory correction for longitudinal chromatic aberration all over the zoom range. Condition (5) is provided to properly determine the Abbe's numbers of lenses when they are used to construct the positive second lens unit (U2) of a doublet. If this condition is satisfied, it is then possible to make satisfactory correction for longitudinal chromatic aberration all over the zoom range.

Falling below the lower limit of 30 to condition (5) renders it difficult to make satisfactory correction for chromatic aberration of magnification all over the zoom range.

Preferably in any one of the first, second and subsequent depending aspects of the invention, the positive third lens unit (U3) should comprise at least one aspheric surface.

In the first aspect of the invention, the positive second and third lens units (U2, U3) are designed to have a relatively short focal length, as already mentioned. Accordingly, the longer the focal length at the telephoto end, the larger the spherical aberrations and coma produced there become. It is thus necessary to produce at the negative first lens unit (U1) aberrations large enough to cancel out these aberrations. This offers a problem that the sensitivities of the positive second and third lens units (U2, U3) to decentration with respect to the negative first lens unit (U1) become high. It is thus preferable to use an aspheric surface for at least one surface in the positive second and third lens units (U2, U3), thereby reducing aberrations produced at the positive second and third lens units (U2, U3) to a certain degree. It is then possible to reduce the amount of aberrations produced at the negative first lens unit (U1), thereby lowering the sensitivities of the positive second and third lens units (U2, U3) to decentration with respect to the negative positive lens unit (U1).

To make satisfactory correction for spherical aberrations at the positive lens units, it is further preferable to use at least one aspheric surface at a site close to an aperture stop, i.e., at least one aspheric surface in the positive third lens unit (U3).

Condition (6) is provided to determine the amount of an aspheric surface when the aspheric surface is used in the positive third lens unit (U3). When the upper limit of $4.5 \times 10^{-2}$ to condition (6) is exceeded or the amount of an aspheric surface becomes too much, aberrations at the aspheric surface are overcorrected, and so it is impossible to make any satisfactory correction for aberrations at the positive third lens unit (U3) alone.

Third Aspect of the Invention

Designed to operate in a simple two-group zoom mode as in the first aspect of the invention, the third aspect of the zoom optical system of the invention comprises, in order from an object side thereof, a first lens group having positive refracting power and a second lens group having negative refracting power. For zooming from the wide-angle end to the telephoto end of the optical system, the respective lens groups move toward the object side with a decreasing spacing between the first and the second lens group.

The first lens group is composed of, in order from its object side, a first lens unit (U1) having negative refracting power, a second lens unit (U2) having positive refracting power and a third lens group (U3) having positive refracting power. The first lens unit (U1) is made up of a doublet consisting of, in order from its object side, a negative lens and a positive lens, and the second lens unit (U2) is made up of a doublet consisting of, in order from its object side, a negative lens and a positive lens.

With a zoom optical system having a zoom ratio of 3 or greater while maintaining an angle of view of 70° or greater at the wide-angle end as envisaged in the invention, it is difficult to make proper correction for spherical aberrations and coma produced at the negative first lens unit (U1) and positive second lens unit (2). If the first and second lens units (U1, U2) are constructed of such doublets as mentioned above, aberrations enough to cancel out such spherical aberrations and coma can then produced at the cemented surface convex on the object side, so that the spherical aberrations and coma at the first and second lens units (U1, U2) can be well corrected. The use of the doublets enables chromatic aberration of magnification to be corrected at the first lens unit (U1) having an off-axis ray bundle at a high position and longitudinal chromatic aberration to be corrected at the second lens unit (U2) having an axial ray bundle at a high position, so that chromatic aberrations can be well corrected all over the zoom range.

Fourth Aspect of the Invention

Designed to operate in a simple two-group zoom mode as in the first aspect of the invention, the fourth aspect of the zoom optical system of the invention comprises, in order from an object side thereof, a first lens group having positive refracting power and a second lens group having negative refracting power. For zooming from the wide-angle end to the telephoto end of the optical system, the respective lens groups move toward the object side with a decreasing spacing between the first and the second lens group.

Basically, the first lens group of the invention is of the retrofocus type comprising, in order from its object side, a front lens unit (UF) having negative refracting power and a rear lens unit (UR) having positive refracting power.

Preferably for a two-group zoom mode as contemplated herein, aberrations produced at each lens group should be reduced or limited. To this end, the first lens group is so designed that aberrations produced at the negative lens unit (UF) cancel out aberrations produced at the positive lens unit (UR), whereby aberrations can be well corrected throughout the optical system.

With a zoom optical system having a zoom ratio of 3 or greater while maintaining an angle of view of 70° or greater at the wide-angle end as envisaged herein, however, it is necessary to reduce the focal length of the positive lens unit (UR) to a certain degree. Aberrations such as, spherical aberrations, coma and astigmatism at the positive lens unit (UR) become too large to efficiently cancel out them at the negative lens unit (UF).

According to the fourth aspect of the invention, this difficulty is overcome by constructing the negative lens unit (UF) of, in order from its object side, a first lens unit (U1) that has negative refracting power and in which the surface located nearest to the object side is concave on the object side and a second lens unit (U2) having positive refracting power, so that the aberrations can be properly produced. Much astigmatism is produced at the negative first lens unit (U1) that has an off-axis ray bundle at a high position and in which the surface located nearest to the object side is concave on the object side, and much spherical aberrations and coma are produced at the second lens unit (U2) having an axial ray bundle at a high position, so that the aberrations can cancel out one another at these lens units in the first lens group. To produce spherical aberrations and coma in a more efficient manner, the positive second lens unit (U2) should preferably be in a meniscus form convex on the object side.

The positive lens unit (UR) is composed of, in order from its object side, a third lens unit (U3) having negative refracting power and a fourth lens unit (U4) having positive refracting power. With this arrangement, a portion of aberrations produced at the positive fourth lens unit (U4) including much spherical aberrations and coma can be corrected at the negative third lens unit (U3), so that the load of the negative lens unit (UF) on correction of aberrations can be mitigated and the sensitivities of the positive lens unit (UR) and negative lens unit (UF) to decentration can be reduced.

Each lens unit in the first lens group is composed of a single lens or a doublet for correction of chromatic aberrations. The first lens group is thus of a simple construction composed of four independent lens units with no air space between them, so that improved assembly capabilities are achieved.

Fifth Aspect of the Invention

Designed to operate in a simple two-group zoom mode as in the first aspect of the invention, the fifth aspect of the zoom optical system of the invention comprises, in order from an object side thereof, a first lens group having positive refracting power and a second lens group having negative refracting power. For zooming from the wide-angle end to the telephoto end of the optical system, the respective lens groups move toward the object side with a decreasing spacing between the first and the second lens group.

Basically, the first lens group of the invention is of the retrofocus type comprising, in order from its object side, a front lens unit (UF) having negative refracting power and a rear lens unit (UR) having positive refracting power.

Preferably for a two-group zoom mode as contemplated herein, aberrations produced at each lens group should be reduced or limited. To this end, the first lens group is so designed that aberrations produced at the negative lens unit (UF) cancel out aberrations produced at the positive lens unit (UR), whereby aberrations can be well corrected throughout the optical system.

With a zoom optical system having a zoom ratio of 3 or greater while maintaining an angle of view of 70° or greater at the wide-angle end as envisaged herein, however, it is necessary to reduce the focal length of the positive lens unit (UR) to a certain degree. Aberrations such as spherical aberrations, coma and astigmatism at the positive lens unit (UR) become too large to efficiently cancel out them at the negative lens unit (UF).

According to the fifth aspect of the invention, this difficulty is overcome by constructing the negative lens unit (UF) of, in order from its object side, a first lens unit (U1) that has negative refracting power and in which the surface located nearest to the object side is concave on the object side and a second lens unit (U2) having positive refracting power, so that the aberrations can be properly produced. Much astigmatism is produced at the first lens unit (U1) that has an off-axis ray bundle at a high position and in which the surface located nearest to the object side is concave on the object side, and much spherical aberrations and coma are produced at the second lens unit (U2) having an axial ray bundle at a high position, so that the aberrations can cancel out one another at these lens units in the first lens group. To produce spherical aberrations and coma in a more efficient manner, the positive second lens unit (U2) should preferably be in a meniscus form convex on the object side.

The positive lens unit (UR) is composed of, in order from its object side, a third lens unit (U3) having negative or positive refracting power and a fourth lens unit (U4) having positive refracting power. With this arrangement, a portion of aberrations produced at the positive fourth lens unit (U4) including much spherical aberrations and coma can be corrected at the negative third lens unit (U3), so that the load of the negative lens unit (UF) on correction of aberrations can be mitigated and the sensitivities of the positive lens unit (UR) and negative lens unit (UF) to decentration can be reduced.

Each lens unit in the first lens group is composed of a single lens or a doublet for correction of chromatic aberrations. The first lens group is thus of a simple construction composed of four independent lens units with no air space between them, so that improved assembly capabilities are achieved.

To slim down an associated camera and ensure satisfactory performance all over the zoom range, the fifth aspect of the invention should satisfy conditions (7) and (8).

In the invention, the space between the principal points of the negative and positive lens units is narrowed by allowing the negative lens unit (UF) in the first lens group to have a relatively short focal length and the positive lens unit (UR) to have a short focal length, accordingly. Thus, the principal point of the first lens group can be brought closer to the image plane side, so that the desired back focus can be easily ensured. Condition (7) should be satisfied to properly determine the back focus, especially because the negative lens unit (UF) is of negative power and so the focal length of the negative first lens unit (U1) becomes relatively short.

When the lower limit of 0.5 to condition (7) is not reached or the focal length of the first lens unit (U1) become long, it is impossible to ensure the necessary back focus at the wide-angle end, resulting in an increase in the lens diameter of the second lens group and an increase in the size of an associated camera. When the upper limit of 3 condition (7) is exceeded or the focal length of the first lens unit (U1) becomes short, some long back focus may be obtained, but the associated camera cannot be slimmed down because of an increase in the length of the optical system all over the zoom range, and especially at the telephoto end.

When the focal length of the positive lens unit (UR) is relatively shortened to ensure some back focus, it is difficult to make correction for aberrations at the first lens group, because the focal length of the positive fourth lens unit (U4) becomes short and so spherical aberrations and coma at the positive fourth lens unit (U4) become larger at the telephoto end. If, in this case, the load of the third lens unit (U3) on correction of aberrations is properly determined, it is then possible to reduce aberrations produced at the positive lens unit (UR) to a certain degree. By properly determining the focal length of the third lens unit (U3) according to condition (8), it is thus possible to make satisfactory correction for aberrations at the first lens group.

When the lower limit of −0.4 to condition (8) is not reached, it is impossible to ensure any satisfactory performance all over the zoom range, because the negative focal length of the third lens unit (U3) becomes short and spherical aberrations and coma produced at the positive fourth lens unit (U4) become large at the telephoto end. When the upper limit of 0.1 to condition (8) is exceeded, it is difficult to ensure the necessary back focus at the wide-angle end because the positive focal length of the third lens unit (U3) becomes short.

Preferably in the fourth or fifth aspect of the invention, at least one surface of the positive second lens unit (U2) or the positive fourth lens unit (U4) should be defined by an aspheric surface. The aspheric surface should then preferably be applied to where spherical aberrations and coma can be produced in a more efficient manner to cancel out them one another. By applying an aspheric surface to at least one surface of the positive second lens unit (U2), it is possible to produce aberrations at the positive lens unit (UR) so efficiently that aberrations can be well corrected at the first lens group. It is also preferable to apply an aspheric surface to at least one surface of the positive fourth lens unit (U4). In this case, the amount of aberrations produced at the positive fourth lens unit (U4) can be so reduced that the load of the negative lens unit (UR) on correction of aberrations can be mitigated, thereby lowering the sensitivities of the negative lens unit (UR) and positive lens unit (UR) to decentration.

Sixth Aspect of the Invention

Designed to operate in a simple two-group zoom mode as in the first aspect of the invention, the sixth aspect of the zoom optical system of the invention comprises, in order from an object side thereof, a first lens group having positive refracting power and a second lens group having negative refracting power. For zooming from the wide-angle end to the telephoto end of the optical system, the respective lens groups move toward the object side with a decreasing spacing between the first and the second lens group.

Basically, the first lens group of the invention is of the retrofocus type comprising, in order from its object side, a front lens unit (UF) having negative refracting power and a rear lens unit (UR) having positive refracting power.

Preferably for a two-group zoom mode as contemplated herein, aberrations produced at each lens group should be reduced or limited. To this end, the first lens group is so designed that aberrations produced at the negative lens unit (UF) cancel out aberrations produced at the positive lens unit (UR), whereby aberrations can be well corrected throughout the optical system.

With a zoom optical system having a zoom ratio of 3 or greater while maintaining an angle of view of 70° or greater at the wide-angle end as envisaged herein, however, it is necessary to reduce the focal length of the positive lens unit (UR) to a certain degree. Aberrations such as spherical aberrations, coma and astigmatism at the positive lens unit (UR) become too large to efficiently cancel out them at the negative lens unit (UF).

According to the sixth aspect of the invention, this difficulty is overcome by constructing the negative lens unit (UF) of, in order from its object side, a first lens unit (U1) that has negative refracting power and in which the surface located nearest to the object side is concave on the object side and a second lens unit (U2) having positive refracting power, so that the aberrations can be properly produced.

Much astigmatism is produced at the first lens unit (U1) that has an off-axis ray bundle at a high position and in which the surface located nearest to the object side is concave on the object side, and much spherical aberrations and coma are produced at the second lens unit (U2) having an axial ray bundle at a high position, so that the aberrations can cancel out one another at these lens units in the first lens group. To produce spherical aberrations and coma in a more efficient manner, the positive second lens unit (U2) should preferably be in a meniscus form convex on the object side.

To enable the positive second lens unit (U2) to produce spherical aberrations and coma in a more efficient manner, it is preferable to apply an aspheric surface to at least one surface of the positive second lens unit (U2). If the positive second lens unit (U2) is formed of a plastic lens, it is then possible to fabricate an aspheric lens at low costs.

The positive lens unit (UR) is composed of, in order from its object side, a third lens unit (U3) and a fourth lens unit (U4) having positive refracting power. With this arrangement, a portion of aberrations produced at the positive fourth lens unit (U4) including much spherical aberrations and coma can be corrected at the negative third lens unit (U3), so that the load of the negative lens unit (UF) on correction of aberrations can be mitigated and the sensitivities of the positive lens unit (UR) and negative lens unit (UF) to decentration can be reduced.

In this case, since the plastic lens is used for the positive second lens unit (U2) in the negative lens unit (UF) as mentioned just above, this second lens unit (U2) is susceptible to temperature and humidity; the focal length of the positive second lens unit (U2) must be increased to a certain degree. Thus, it is preferable to make the focal length of the third lens unit (U3) positive to ensure positive refracting power within the first lens group.

Each lens unit in the first lens group is composed of a single lens or a doublet for correction of chromatic aberrations. The first lens group is thus of a simple construction composed of four independent lens units with no air space between them, so that improved assembly capabilities are achieved.

To slim down an associated camera and ensure satisfactory performance all over the zoom range, the sixth aspect of the invention should satisfy conditions (9), (10) and (11).

A problem with the positive second lens unit (U2) in the first lens group is that the image-formation plane displaces due to changes in the index of refraction and the shape of the lens surface due to temperature changes, because it is formed of the plastic material, as already mentioned. In the invention, the displacement of the image-formation plane is reduced by reversing the displacement direction of the image-formation plane due to the changes in the index of refraction and the surface shape. If the focal length of the plastic material is properly determined according to conditions (9) and (10), it is then possible to reduce the displacement of the image-formation plane due to temperature changes, even when the index of refraction of the plastic material changes largely due to temperature changes.

Condition (9) is indicative of a refractive index difference between −10° C. and 40° C. of the plastic material used herein. If the focal length of the positive second lens unit (U2) is properly determined according to condition (10), it is then possible to configure the lens in such a way as to reduce fluctuations of the image-formation plane with temperature changes.

When the upper limit of 0.25 to condition (10) is exceeded, the focal length of the positive second lens unit (U2) becomes short, and so there is too large a fluctuation of the image-formation plane due to changes in the lens shape upon temperature changes, resulting in a large displacement of the image-formation plane.

When the focal length of the positive lens unit (UR) is relatively shortened to ensure some back focus, it is difficult to make correction for aberrations at the first lens group, because the focal lengths of the positive third and fourth lens units (U3, U4) become short and so spherical aberrations and coma at the positive fourth lens unit (U4) in particular become larger at the telephoto end. If, in this case, the load of the third lens unit (U3) on correction of aberrations is properly determined, it is then possible to reduce aberrations produced at the positive lens unit (UR) to a certain degree. By properly determining the focal length of the positive third lens unit (U3) according to condition (11), it is thus possible to make satisfactory correction for aberrations at the first lens group.

When the upper limit of 0.5 to condition (11) is exceeded or the focal length of the positive third lens unit (U3) becomes short, it is impossible to ensure any satisfactory performance all over the zoom range, because spherical aberrations and coma produced at the positive fourth lens unit (U4) become large at the telephoto end.

Seventh Aspect of the Invention

Designed to operate in a simple two-group zoom mode as in the first aspect of the invention, the seventh aspect of the zoom optical system of the invention comprises, in order from an object side thereof, a first lens group having positive refracting power and a second lens group having negative refracting power. For zooming from the wide-angle end to the telephoto end of the optical system, the respective lens groups move toward the object side with a decreasing spacing between the first and the second lens group.

The first lens group is composed, in order from its object side, a first lens unit (U1) that has negative refracting power and in which the surface located nearest to the object side is concave on the object side, a second lens unit (U2) that has positive refracting power and is a meniscus form convex on the object side, a third lens unit (U3) comprising a doublet consisting of, in order from its object side, a negative lens and positive lens and a fourth lens unit (U4) having positive refracting power.

Preferably for a two-group zoom mode as contemplated herein, aberrations produced at each lens group should be reduced or limited. To this end, the first lens group is so designed that aberrations produced at the negative lens unit (UF) cancel out aberrations produced at the positive lens unit (UR), whereby aberrations can be well corrected throughout the optical system.

With a zoom optical system having a zoom ratio of 3 or greater while maintaining an angle of view of 70° or greater at the wide-angle end as envisaged herein, however, it is necessary to reduce the focal length of the positive lens unit (UR) to a certain degree. Aberrations such as spherical aberrations, coma and astigmatism at the positive lens unit (UR) become too large to efficiently cancel out them at the negative lens unit (UF).

According to the seventh aspect of the invention, this difficulty is overcome by constructing the negative lens unit (UF) of, in order from its object side, a first lens unit (U1) that has negative refracting power and in which the surface located nearest to the object side is concave on the object side and a second lens unit (U2) having positive refracting power, so that the aberrations can be properly produced.

Much astigmatism is produced at the first lens unit (U1) that has an off-axis ray bundle at a high position and in which the surface located nearest to the object side is concave on the object side, and much spherical aberrations and coma are produced at the second lens unit (U2) having an axial ray bundle at a high position, so that the aberrations can cancel out one another at these lens units in the first lens group. To produce spherical aberrations and coma in a more efficient manner, the positive second lens unit (U2) should preferably be in a meniscus form convex on the object side.

The positive lens unit (UR) is composed of, in order from its object side, a third lens unit (U3) having negative or positive refracting power and a fourth lens unit (U4) having positive refracting power. With this arrangement, a portion of aberrations produced at the positive fourth lens unit (U4) including much spherical aberrations and coma can be corrected at the negative third lens unit (U3), so that the load of the negative lens unit (UF) on correction of aberrations can be mitigated and the sensitivities of the positive lens unit (UR) and negative lens unit (UF) to decentration can be reduced.

Furthermore, the third lens unit (U3) is formed of a doublet consisting of, in order from its object side, a negative lens and a positive lens; the cemented surface is defined by a surface convex on the object side, so that suitable spherical aberrations and coma can be produced at that surface. It is thus possible to achieve further reductions in aberrations at the positive lens unit (UR). The use of the doublet for the third lens unit (U3) enables longitudinal chromatic aberration at the telephoto end to be well corrected.

If the lower limit to condition (1) is set at 0.5 or the upper limit is set at 0.7, much better results are obtainable.

If the lower limit to condition (2) is set at 0.9 or the upper limit is set at 2.0, much better results are obtainable.

If the lower limit to condition (3) is set at 0.5 or the upper limit is set at 2.0 and preferably 0.7, much better results are obtainable.

If the lower limit to condition (4) is set at 0.9 or the upper limit is set at 2.0, much better results are obtainable.

If the lower limit to condition (5) is set at 35 or the upper limit is set at 45, much better results are obtainable.

If the lower limit to condition (7) is set at 0.8 or the upper limit is set at 2.0, much better results are obtainable.

If the lower limit to condition (8) is set at −0.33 or the upper limit is set at 0.05, much better results are obtainable.

If the lower limit to condition (10) is set at 0.1 or the upper limit is set at 0.22, much better results are obtainable.

If the upper limit to condition (11) is set at 0.36, much better results are obtainable.

As long as the aforesaid constituting elements or conditions are satisfied as disclosed in the following examples, the desired effects are obtainable no matter how they are combined.

Examples 1 to 12 of the zoom optical system according to the invention are now given. Numerical data on each example will be given later.

EXAMPLES 1, 2, 3, AND 4

FIGS. 1(a), 1(b) and 1(c) are illustrative in section of the lens arrangements of Example 1 at the wide-angle end (a), in the standard state (b) and at the telephoto end (c), respectively. Sectional lens arrangement views for Examples 2 to 4 are omitted for the reason of similarity to Example 1.

Examples 1 to 4 correspond to the first, second and third aspects of the invention. The first lens group G1 is made up of, in order from its object side, a lens unit U1 having negative refracting power, a lens unit U2 having positive refracting power and a lens unit U3 having positive refracting power. The lens unit U1 is made up of a doublet consisting of, in order from its object side, a double-concave negative lens and a double-convex positive lens, the lens unit U2 is made up of a doublet consisting of, in order from its object side, a negative meniscus lens convex on the object side and a double-convex positive lens, and the lens unit U3 is made up of one double-convex positive lens.

The second lens group G2 is made up of, in order from its object side, a lens unit U4 having negative refracting power, a lens unit U5 having positive refracting power and a lens unit U6 having negative refracting power. The lens unit U4 is made up of one negative meniscus lens concave on the object side, the lens unit U5 is made up of one positive meniscus lens concave on the object side, and the lens unit U6 is made up of one negative meniscus lens concave on the object side.

For zooming from the wide-angle end to the telephoto end of the zoom optical system, the respective lens groups move toward the object side with a decreasing spacing between the first lens group G1 and the second lens group G2. An aperture stop is located on the image side of the first lens group G1, and moves together with the first lens group G1 during zooming.

Three aspheric surfaces are used, two at both surfaces of the lens unit U3 and one at the object-side surface of the lens unit U4.

EXAMPLE 5

Figure 2B:
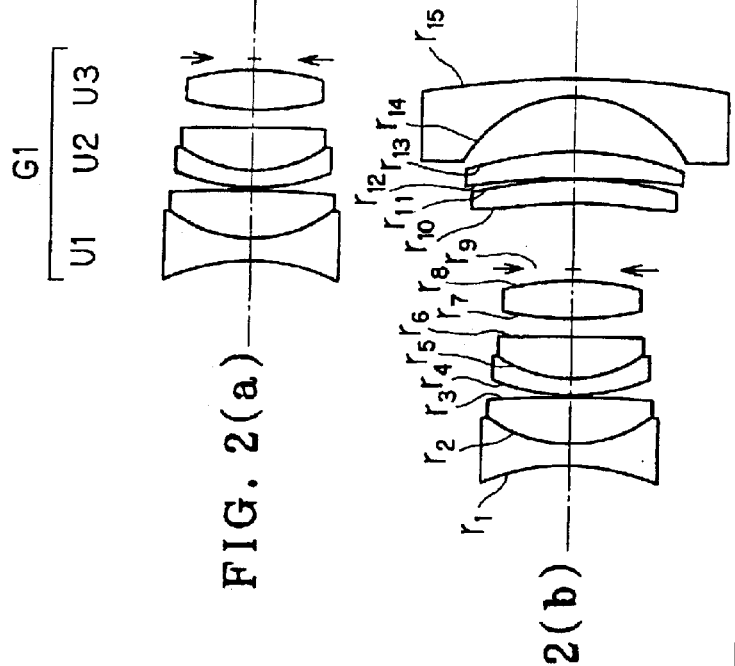
Figure 2C:
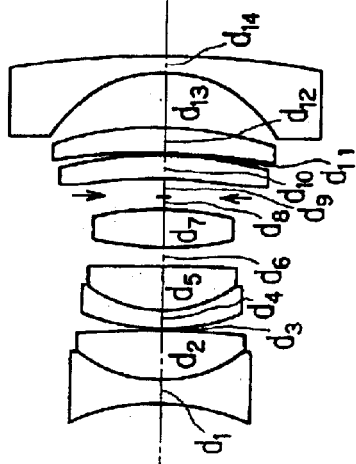

FIGS. 2(a), 2(b) and 2(c) are illustrative in section of the lens arrangements of Example 5 at the wide-angle end (a), in the standard state (b) and at the telephoto end (c), respectively.

Example 5 corresponds to the first, second and third aspects of the invention. The first lens group G1 is made up of, in order from its object side, a lens unit U1 having negative refracting power, a lens unit U2 having positive refracting power and a lens unit U3 having positive refracting power. The lens unit U1 is made up of a doublet consisting of, in order from its object side, a double-concave negative lens and a double-convex positive lens, the lens unit U2 is made up of a doublet consisting of, in order from its object side, a negative meniscus lens convex on the object side and a double-convex positive lens, and the lens unit U3 is made up of one double-convex positive lens.

The second lens group G2 is made up of, in order from its object side, a lens unit U4 having negative refracting power, a lens unit U5 having positive refracting power and a lens unit U6 having negative refracting power. The lens unit U4 is made up of one negative meniscus lens concave on the object side, the lens unit U5 is made up of one positive meniscus lens concave on the object side, and the lens unit U6 is made up of one negative meniscus lens concave on the object side.

For zooming from the wide-angle end to the telephoto end of the zoom optical system, the respective lens groups move toward the object side with a decreasing spacing between the first lens group G1 and the second lens group G2. An aperture stop is located on the image side of the first lens group G1, and moves together with the first lens group G1 during zooming.

Two aspheric surfaces are used, one at the image-side surface of the lens unit U3 and another at the object-side surface of the lens unit U4.

EXAMPLE 6

FIGS. 3(a), 3(b) and 3(c) are illustrative in section of the lens arrangements of Example 6 at the wide-angle end (a), in the standard state (b) and at the telephoto end (c), respectively.

Example 6 corresponds to the first, second and third aspects of the invention. The first lens group G1 is made up of, in order from its object side, a lens unit U1 having negative refracting power, a lens unit U2 having positive refracting power and a lens unit U3 having positive refracting power. The lens unit U1 is made up of a doublet consisting of, in order from its object side, a double-concave negative lens and a double-convex positive lens, the lens unit U2 is made up of a doublet consisting of, in order from its object side, a negative meniscus lens convex on the object side and a double-convex positive lens, and the lens unit U3 is made up of one double-convex positive lens.

The second lens group G2 is made up of, in order from its object side, a lens unit U4 having positive refracting power and a lens unit U5 having negative refracting power. The lens unit U4 is made up of one positive meniscus lens concave on the object side, and the lens unit U5 is made up of one negative meniscus lens concave on the object side.

For zooming from the wide-angle end to the telephoto end of the zoom optical system, the respective lens groups move toward the object side with a decreasing spacing between the first lens group G1 and the second lens group G2. An aperture stop is located on the image side of the first lens group G1, and moves together with the first lens group G1 during zooming.

Three aspheric surfaces are used, two at both surfaces of the lens unit U3 and one at the object-side surface of the lens unit U4.

EXAMPLES 7 AND 8

FIGS. 4(a), 4(b) and 4(c) are illustrative in section of the lens arrangements of Example 7 at the wide-angle end (a), in the standard state (b) and at the telephoto end (c), respectively. Sectional lens arrangement views for Example 8 are omitted for the reason of similarity to Example 7.

Examples 7 and 8 correspond to the fourth, fifth and seventh aspects of the invention. The first lens group G1 is made up of, in order from its object side, a lens unit U1 having negative refracting power, a lens unit U2 having positive refracting power, a lens unit U3 having negative refracting power and a lens unit U4 having positive refracting power. The lens unit U1 is made up of one concave negative lens, the lens unit U2 is made up of one positive meniscus lens convex on the object side, the lens unit U3 is made up of a doublet consisting of, in order from its object side, a double-concave negative lens and a double-convex positive lens, and the lens unit U4 is made up of one double-convex positive lens.

The second lens group G2 is made up of, in order from its object side, a lens unit U5 having positive refracting power, a lens unit U6 having positive refracting power and a lens unit U7 having negative refracting power. The lens unit U5 is made up of one positive meniscus lens concave on the object side, the lens unit U6 is made up of one positive meniscus lens concave on the object side, and the lens unit U7 is made up one negative meniscus lens concave on the object side.

For zooming from the wide-angle end to the telephoto end of the zoom optical system, the respective lens groups move toward the object side with a decreasing spacing between the first lens group G1 and the second lens group G2. An aperture stop is located on the image side of the first lens group G1, and moves together with the first lens group G1 during zooming.

Two aspheric surfaces are used, one at the image-side surface of the lens unit U2 and another at the object-side surface of the lens unit U5.

EXAMPLES 9 AND 10

FIGS. 5(a), 5(b) and 5(c) are illustrative in section of the lens arrangements of Example 9 at the wide-angle end (a), in the standard state (b) and at the telephoto end (c), respectively. Sectional lens arrangement views for Example 10 are omitted for the reason of similarity to Example 9.

Examples 9 and 10 correspond to the fourth, fifth and seventh aspects of the invention. The first lens group G1 is made up of, in order from its object side, a lens unit U1 having negative refracting power, a lens unit U2 having positive refracting power, a lens unit U3 having negative refracting power and a lens unit U4 having positive refracting power. The lens unit U1 is made up of one negative meniscus lens concave on the object side, the lens unit U2 is made up of one positive meniscus lens convex on the object side, the lens unit U3 is made up of a doublet consisting of, in order from its object side, a double-concave negative lens and a double-convex positive lens, and the lens unit U4 is made up of one double-convex positive lens.

The second lens group G2 is made up of, in order from its object side, a lens unit U5 having positive refracting power, a lens unit U6 having positive refracting power and a lens unit U7 having negative refracting power. The lens unit U5 is made up of one positive meniscus lens concave on the object side, the lens unit U6 is made up of one positive meniscus lens concave on the object side, and the lens unit U7 is made up of one negative meniscus lens concave on the object side.

For zooming from the wide-angle end to the telephoto end of the zoom optical system, the respective lens groups move toward the object side with a decreasing spacing between the first lens group G1 and the second lens group G2. An aperture stop is located on the image side of the first lens group G1, and moves together with the first lens group G1 during zooming.

Three aspheric surfaces are used, two at both surfaces of the lens unit U4 and one at the object-side surface of the lens unit U5.

EXAMPLES 11 AND 12

Figures 6A, 6B, 6C:
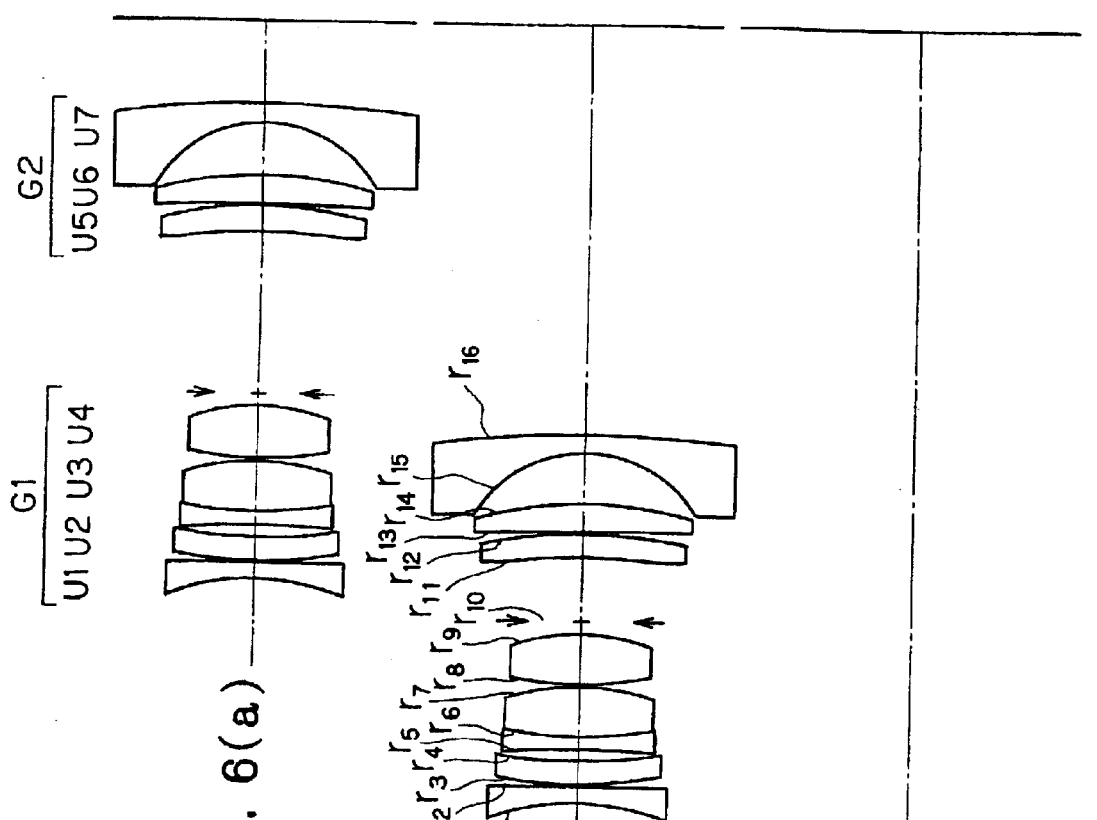
FIGS. 6(a) to 6(c) are sectional lens arrangement views of Example 11 of the zoom optical system according to the invention.
Figure 7A:
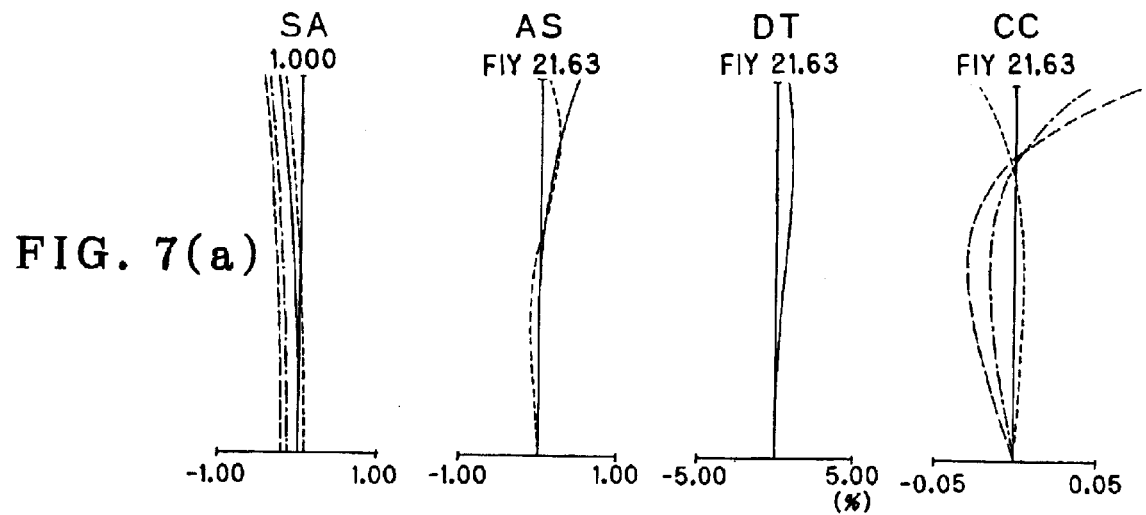
FIGS. 7(a) to 7(c) are aberration diagrams for Example 1 upon focused on an infinite object point.
Figure 7B:
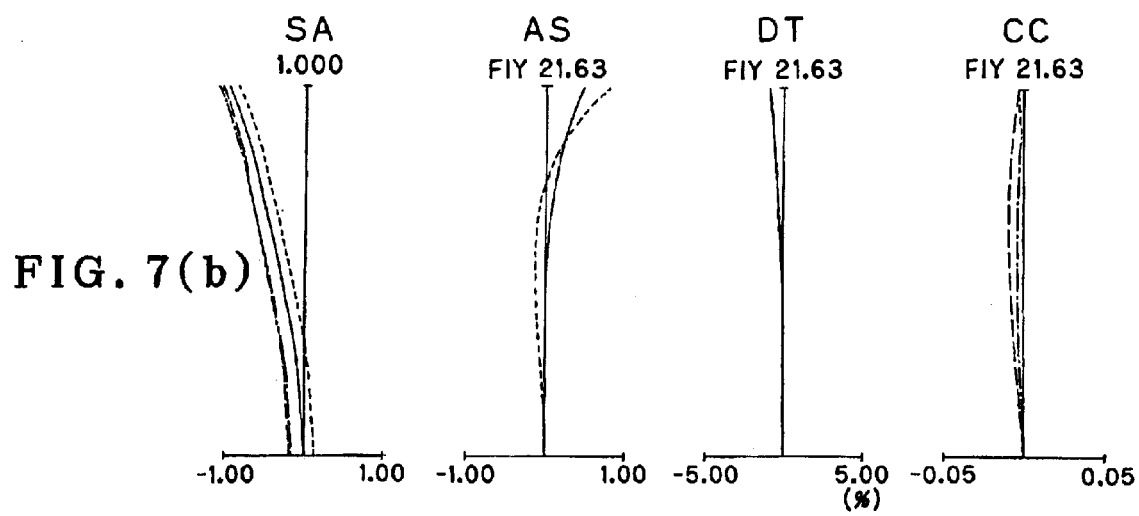
Figure 7C:
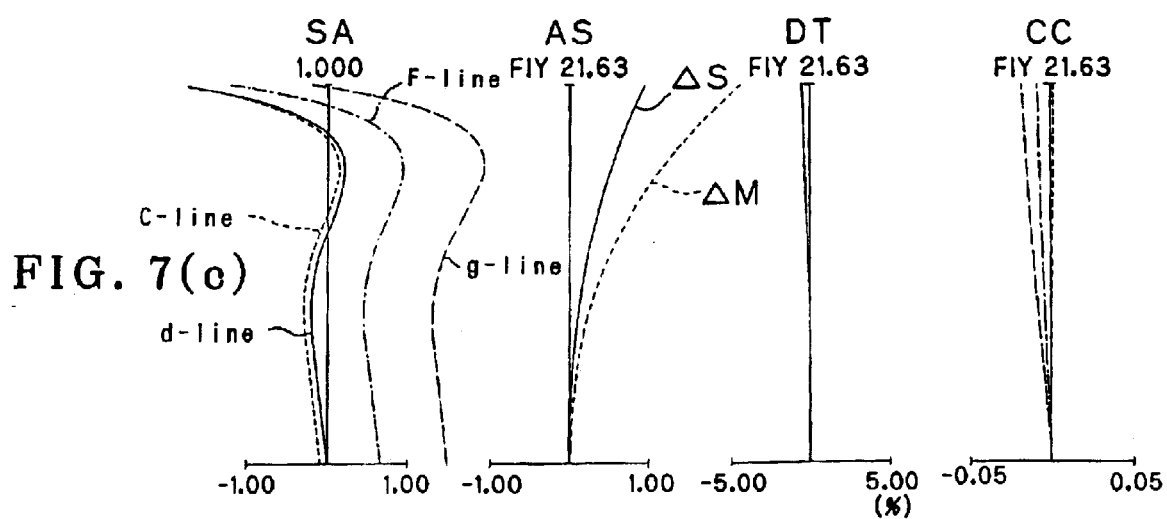
Figure 8A:
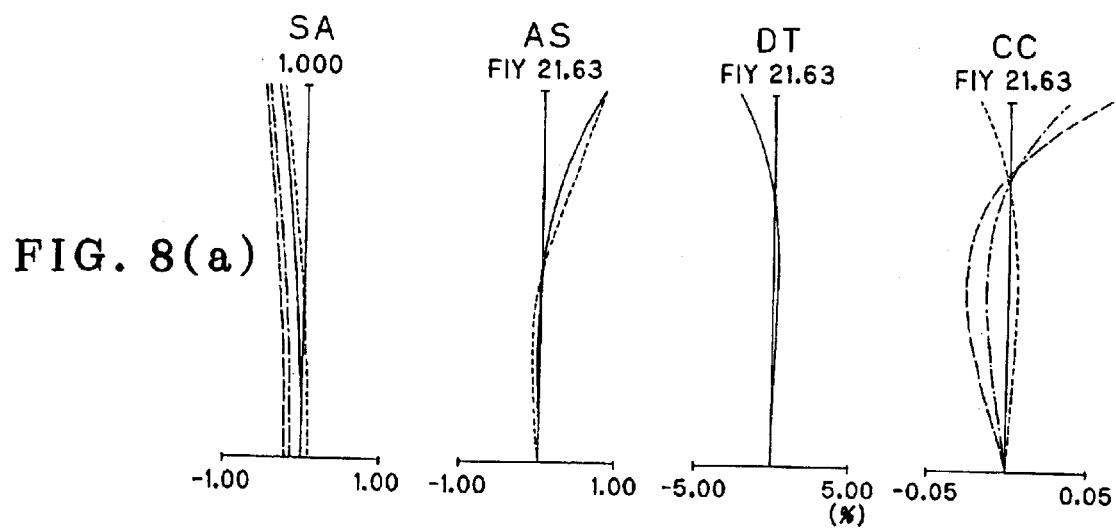
FIGS. 8(a) to 8(c) are aberration diagrams for Example 5 upon focused on an infinite object point.
Figure 8B:
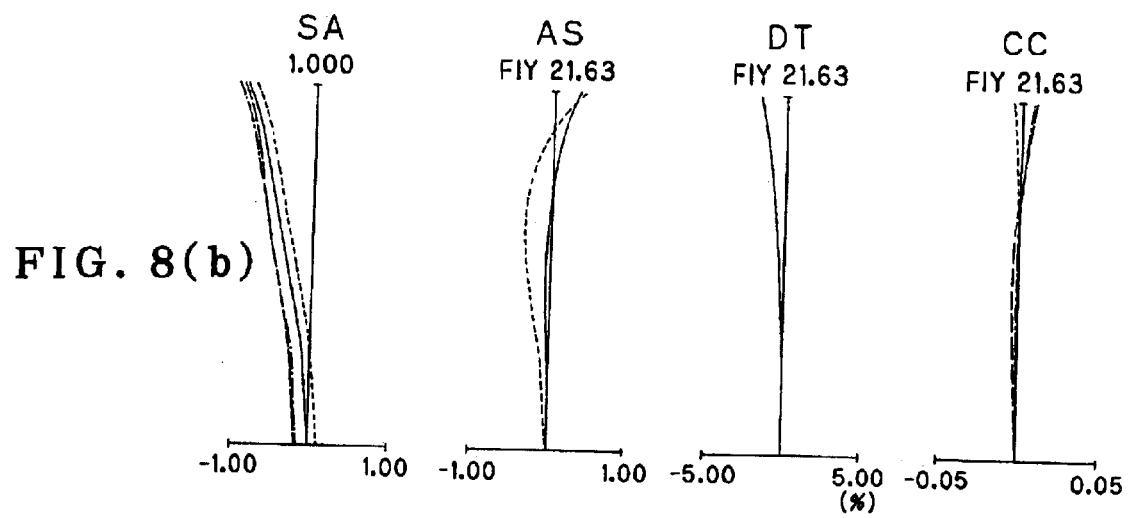
Figure 8C:
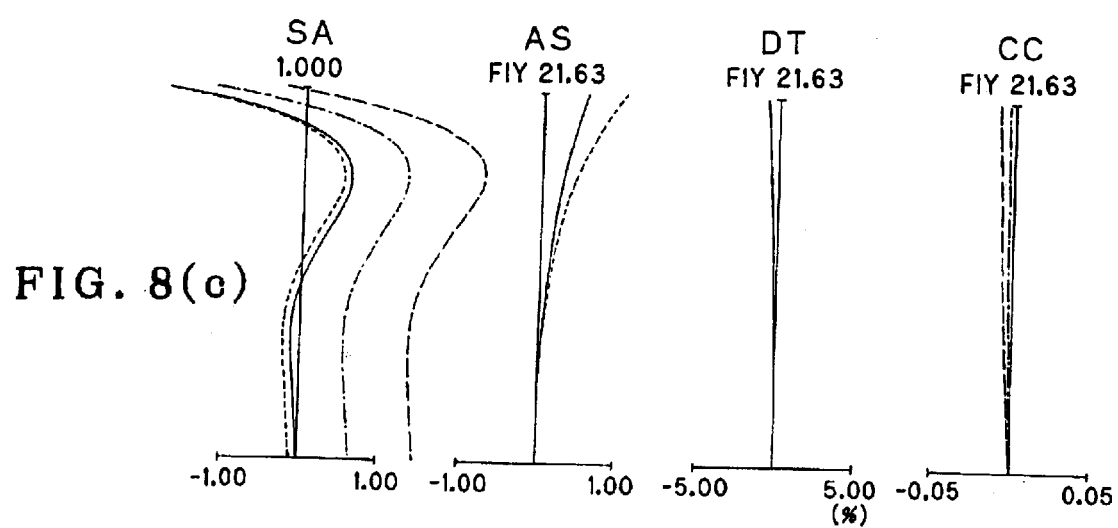
Figure 9A:
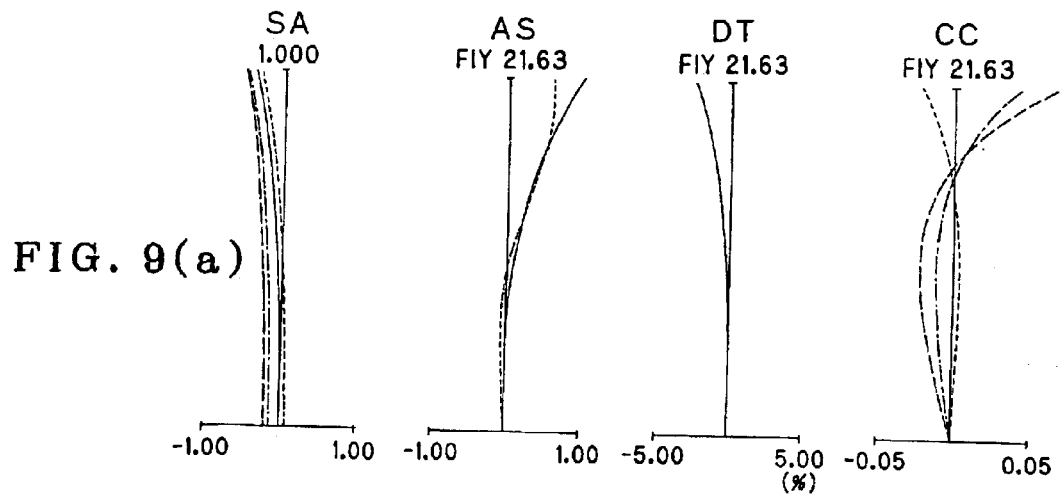
FIGS. 9(a) to 9(c) are aberration diagrams for Example 6 upon focused on an infinite object point.
Figure 9B:
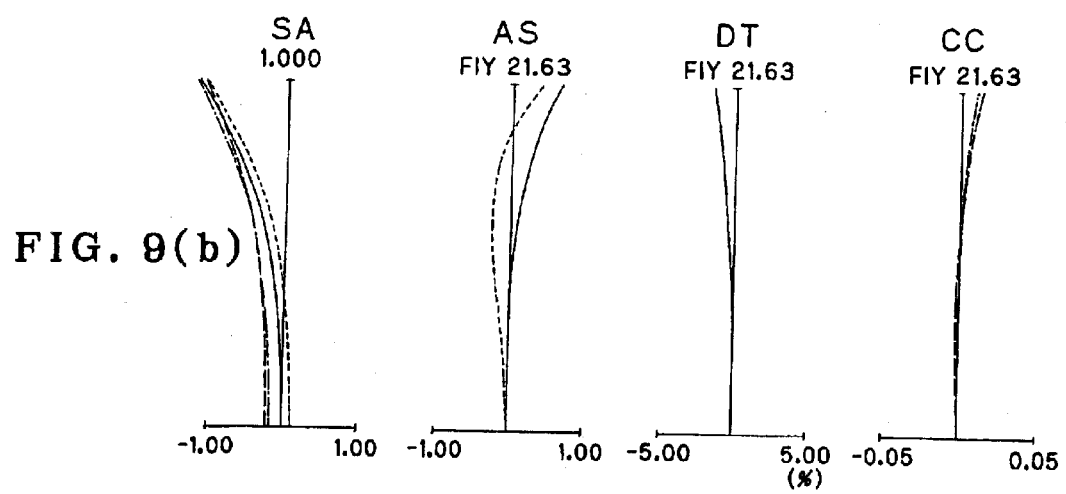
Figure 9C:
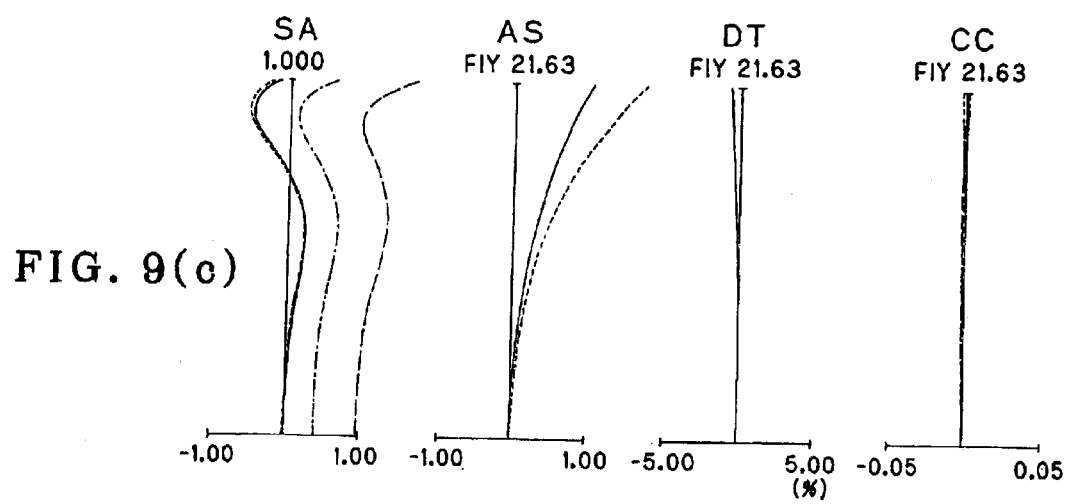
Figure 10A:
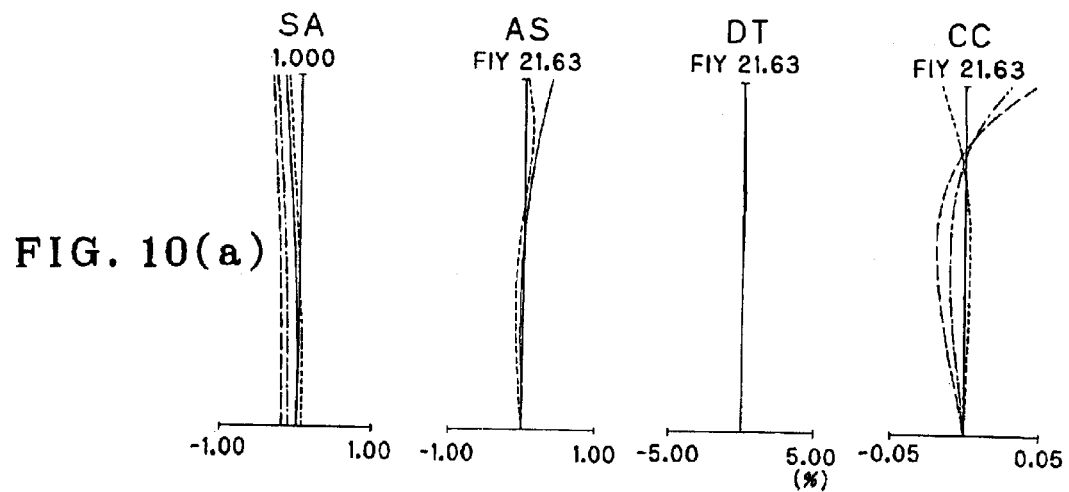
FIGS. 10(a) to 10(c) are aberration diagrams for Example 7 upon focused on an infinite object point.
Figure 10B:
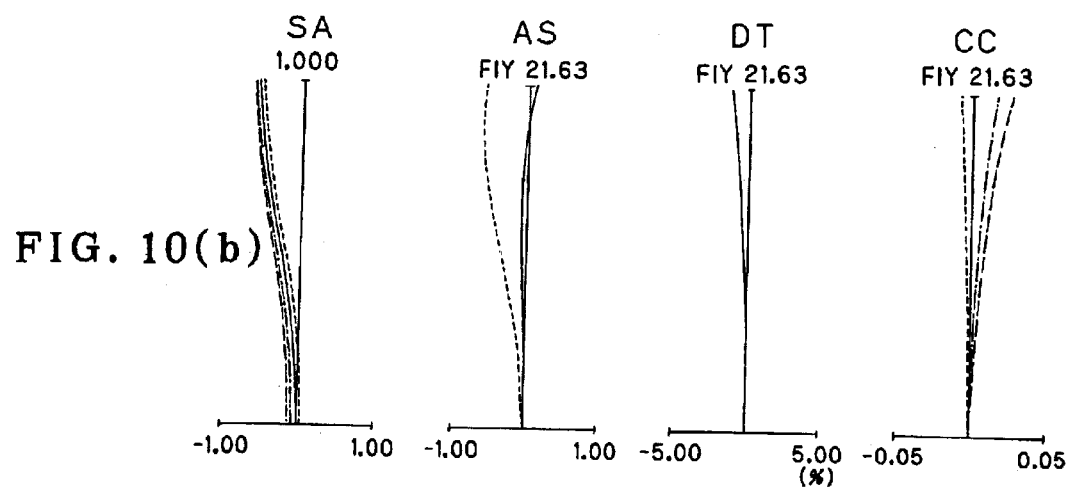
Figure 10C:
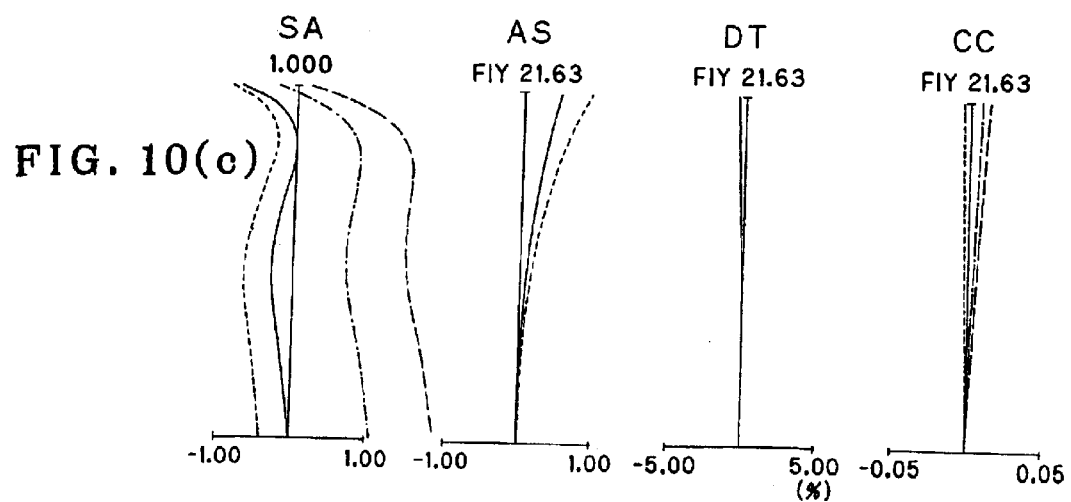
Figure 11A:
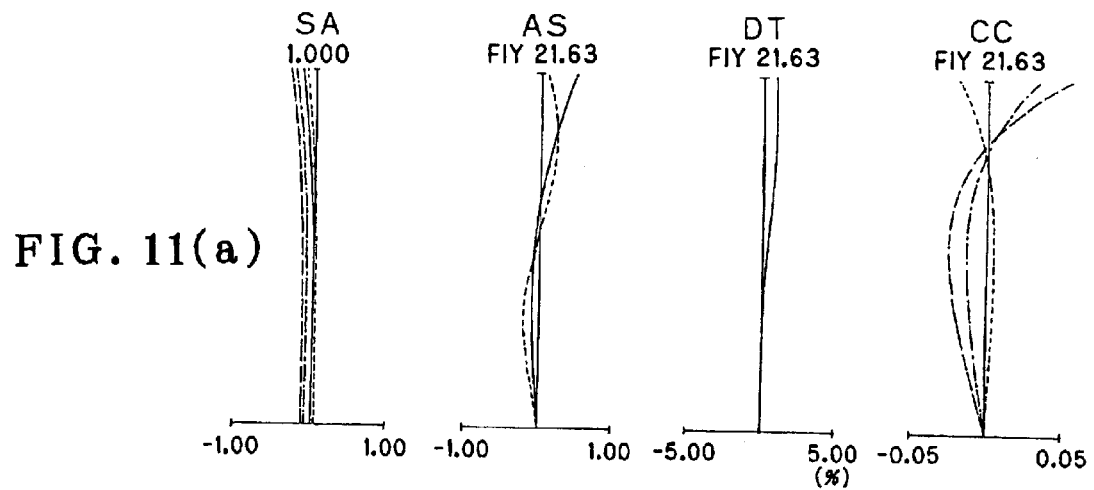
FIGS. 11(a) to 11(c) are aberration diagrams for Example 9 upon focused on an infinite object point.
Figure 11B:
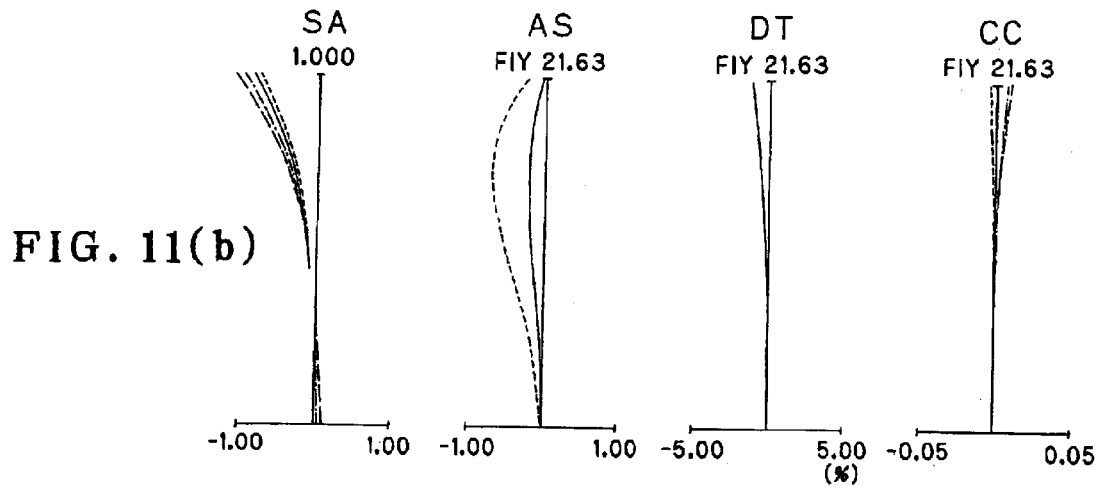
Figure 11C:
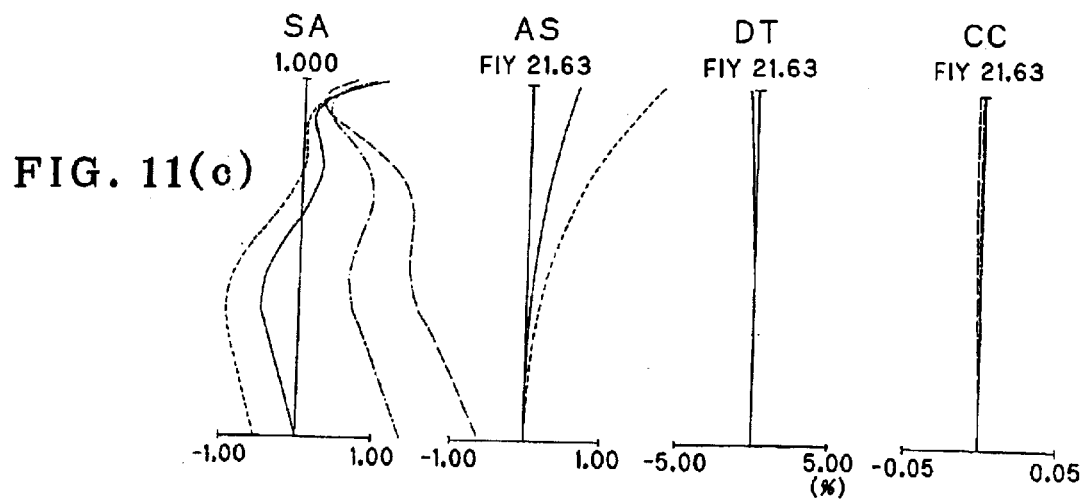
Figure 12A:
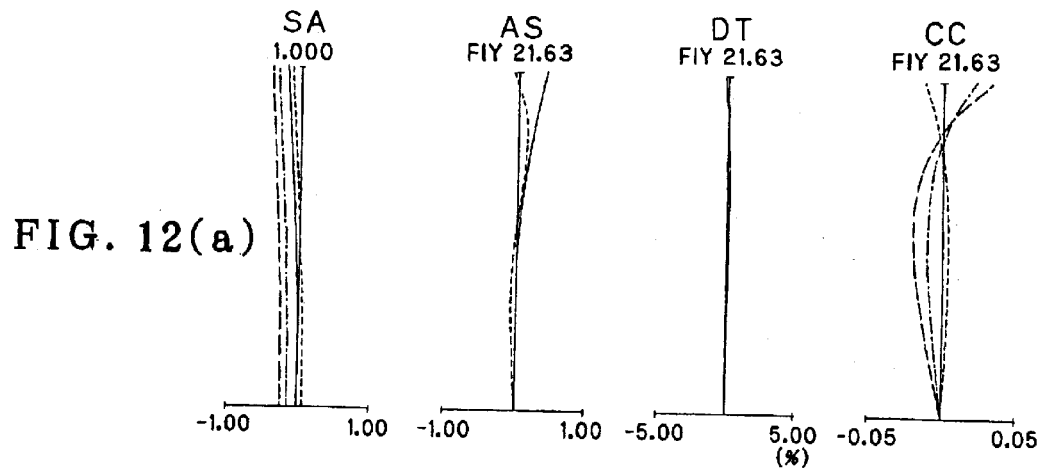
FIGS. 12(a) to 12(c) are aberration diagrams for Example 11 upon focused on an infinite object point.
Figure 12B:
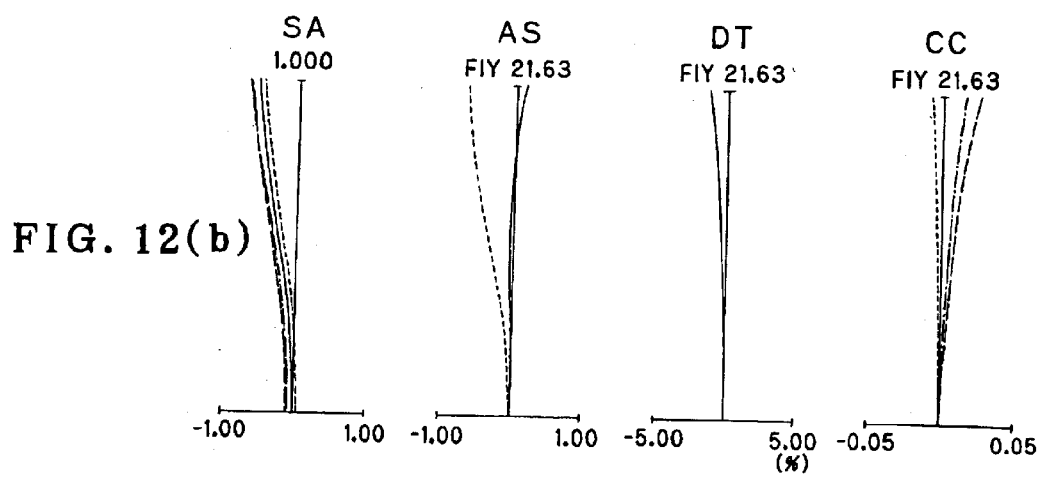
Figure 12C:
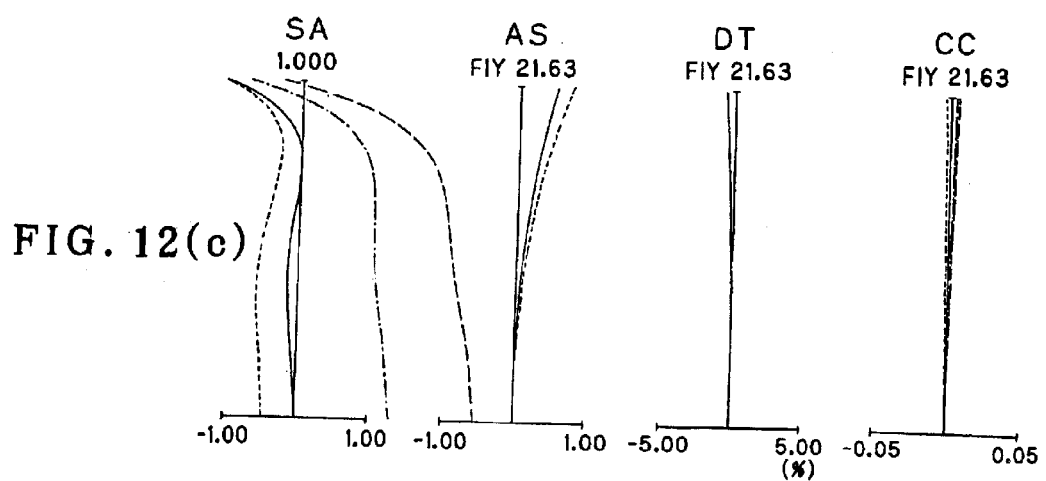

FIGS. 6(a), 6(b) and 6(c) are illustrative in section of the lens arrangements of Example 11 at the wide-angle end (a), in the standard state (b) and at the telephoto end (c), respectively. Sectional lens arrangement views for Example 12 are omitted for the reason of similarity to Example 11.

Examples 11 and 12 correspond to the sixth and seventh aspects of the invention. The first lens group G1 is made up of, in order from its object side, a lens unit U1 having negative refracting power, a lens unit U2 having positive refracting power, a lens unit U3 having positive refracting power and a lens unit U4 having positive refracting power. The lens unit U1 is made up of one double-concave negative, the lens unit U2 is made up of one positive meniscus lens convex on the object side, the lens unit U3 is made up of a doublet consisting of, in order from its object side, a double-concave negative lens and a double-convex positive lens, and the lens unit U4 is made up of one double-convex positive lens.

The second lens group G2 is made up of, in order from its object side, a lens unit U5 having positive refracting power, a lens unit U6 having positive refracting power and a lens unit U7 having negative refracting power. The lens unit U5 is made up of one positive meniscus lens concave on the object side, the lens unit U6 is made up of one positive meniscus lens concave on the object side, and the lens unit U7 is made up of one negative meniscus lens concave on the object side.

For zooming from the wide-angle end to the telephoto end of the zoom optical system, the respective lens groups move toward the object side with a decreasing spacing between the first lens group G1 and the second lens group G2. An aperture stop is located on the image side of the first lens group G1, and moves together with the first lens group G1 during zooming.

Two aspheric surfaces are used, one at the image-side surface of the lens unit U2 and one at the object-side surface of the lens unit U5.

Set out below are numerical data on each example. The symbols used hereinafter, but not used hereinbefore, are indicative of:

f: focal length of the optical system,
2ω: angle of view,
$F_{NO}$: F-number,
WE: wide-angle end,
ST: standard state,
TE: telephoto end,
$r_1, r_2, \ldots$ radius of curvature of each lens surfaces,
$d_1, d_2, \ldots$ spacing between adjacent lens surfaces,
$n_{d1}, n_{d2}, \ldots$ d-line refractive index of each lens,
$\nu_{d1}, \nu_{d2}, \ldots$ Abbe's number of each lens.

Here let x stand for an optical axis with the proviso that the direction of propagation of light is positive, and y represent a direction perpendicular to the optical axis. Then, the shape of an aspheric surface is given by $$x = (y^2/r)/[1+\{1-(K+1)(y/r)^2\}^{1/2}] + A_4 y^4 + A_6 y^6 + A_8 y^8 + A_{10} y^{10}$$

where r is a paraxial radius of curvature, K is a conical coefficient, and $A_4, A_6, A_8$ and $A_{10}$ are the 4th, 6th, 8th and 10th aspheric coefficients, respectively.

(Example 1)

| | | | |
|---|---|---|---|
| $r_1 = -17.646$ | $d_1 = 1.30$ | $n_{d1} = 1.80400$ | $\nu_{d1} = 46.57$ |
| $r_2 = 10.110$ | $d_2 = 4.35$ | $n_{d2} = 1.70154$ | $\nu_{d2} = 41.24$ |
| $r_3 = -145.412$ | $d_3 = 0.20$ | | |
| $r_4 = 15.725$ | $d_4 = 1.30$ | $n_{d3} = 1.69895$ | $\nu_{d3} = 30.13$ |
| $r_5 = 10.286$ | $d_5 = 3.81$ | $n_{d4} = 1.48749$ | $\nu_{d4} = 70.23$ |
| $r_6 = -144.091$ | $d_6 = 1.65$ | | |
| $r_7 = 23.488$ (Aspheric) | $d_7 = 3.54$ | $n_{d5} = 1.58313$ | $\nu_{d5} = 59.46$ |
| $r_8 = -22.325$ (Aspheric) | $d_8 = 0.95$ | | |
| $r_9 = \infty$ (Stop) | $d_9 = $ (Variable) | | |
| $r_{10} = -63.369$ (Aspheric) | $d_{10} = 1.77$ | $n_{d6} = 1.52542$ | $\nu_{d6} = 55.78$ |
| $r_{11} = -70.086$ | $d_{11} = 0.60$ | | |
| $r_{12} = -70.086$ | $d_{12} = 2.68$ | $n_{d7} = 1.64769$ | $\nu_{d7} = 33.79$ |
| $r_{13} = -27.718$ | $d_{13} = 3.80$ | | |
| $r_{14} = -10.612$ | $d_{14} = 1.52$ | $n_{d8} = 1.74100$ | $\nu_{d8} = 52.64$ |
| $r_{15} = -112.566$ | | | |

Aspherical Coefficients

7th surface $K = 0.000$
$A_4 = -1.43213 \times 10^{-5}$
$A_6 = 3.94750 \times 10^{-9}$
$A_8 = 5.98286 \times 10^{-8}$
$A_{10} = -1.20160 \times 10^{-9}$ 8th surface $K = 0.000$
$A_4 = 3.98452 \times 10^{-5}$
$A_6 = 2.33277 \times 10^{-7}$
$A_8 = 5.87436 \times 10^{-8}$
$A_{10} = -1.40490 \times 10^{-9}$ 10th surface $K = 23.440$
$A_4 = 7.02927 \times 10^{-5}$ -continued $A_6 = -4.81427 \times 10^{-12}$
$A_8 = 5.70260 \times 10^{-9}$
$A_{10} = -2.01191 \times 10^{-12}$ Zooming Data (∞)

|  | WE | ST | TE |
|---|---|---|---|
| f (mm) | 28.995 | 55.479 | 106.317 |
| $F_{NO}$ | 5.79 | 8.50 | 13.60 |
| 2ω (°) | 73.10 | 42.95 | 23.12 |
| FB (mm) | 6.68 | 32.48 | 82.00 |
| $d_9$ | 13.05 | 5.50 | 1.55 |

(Example 2)

| $r_1 = -17.894$ | $d_1 = 1.50$ | $n_{d1} = 1.80400$ | $v_{d1} = 46.57$ |
| $r_2 = 9.602$ | $d_2 = 4.59$ | $n_{d2} = 1.70154$ | $v_{d2} = 41.24$ |
| $r_3 = -140.027$ | $d_3 = 0.20$ | | |
| $r_4 = 15.781$ | $d_4 = 1.30$ | $n_{d3} = 1.69895$ | $v_{d3} = 30.13$ |
| $r_5 = 10.298$ | $d_5 = 3.87$ | $n_{d4} = 1.48749$ | $v_{d4} = 70.23$ |
| $r_6 = -118.734$ | $d_6 = 1.62$ | | |
| $r_7 = 25.046$ (Aspheric) | $d_7 = 3.31$ | $n_{d5} = 1.58313$ | $v_{d5} = 59.46$ |
| $r_8 = -22.365$ (Aspheric) | $d_8 = 1.00$ | | |
| $r_9 = \infty$ (Stop) | $d_9 = $ (Variable) | | |
| $r_{10} = -65.208$ (Aspheric) | $d_{10} = 1.80$ | $n_{d6} = 1.52542$ | $v_{d6} = 55.78$ |
| $r_{11} = -72.294$ | $d_{11} = 0.60$ | | |
| $r_{12} = -72.294$ | $d_{12} = 2.70$ | $n_{d7} = 1.64769$ | $v_{d7} = 33.79$ |
| $r_{13} = -27.718$ | $d_{13} = 3.80$ | | |
| $r_{14} = -10.612$ | $d_{14} = 1.52$ | $n_{d8} = -1.74100$ | $v_{d8} = 52.64$ |
| $r_{15} = -104.259$ | | | |

Aspherical Coefficients

7th surface $K = 0.000$
$A_4 = -1.33247 \times 10^{-5}$
$A_6 = 8.59472 \times 10^{-7}$
$A_8 = -7.19877 \times 10^{-10}$
$A_{10} = 2.18915 \times 10^{-11}$ 8th surface $K = 0.000$
$A_4 = 3.68786 \times 10^{-5}$
$A_6 = 1.03343 \times 10^{-6}$
$A_8 = -1.38753 \times 10^{-8}$
$A_{10} = 2.41611 \times 10^{-10}$ 10th surface $K = 25.751$
$A_4 = 6.86747 \times 10^{-5}$
$A_6 = 1.28731 \times 10^{-7}$
$A_8 = 1.71962 \times 10^{-9}$
$A_{10} = 3.38838 \times 10^{-11}$ Zooming Data (∞)

|  | WE | ST | TE |
|---|---|---|---|
| f (mm) | 29.020 | 54.567 | 101.537 |
| $F_{NO}$ | 5.79 | 8.50 | 13.00 |
| 2ω (°) | 73.50 | 43.71 | 24.20 |
| FB (mm) | 6.81 | 32.12 | 78.66 |
| $d_9$ | 13.16 | 5.60 | 1.63 |

(Example 3)

| $r_1 = -19.192$ | $d_1 = 1.50$ | $n_{d1} = 1.80400$ | $v_{d1} = 46.57$ |
| $r_2 = 9.172$ | $d_2 = 4.70$ | $n_{d2} = 1.70154$ | $v_{d2} = 41.24$ |
| $r_3 = -1322.001$ | $d_3 = 0.20$ | | |
| $r_4 = 14.205$ | $d_4 = 1.50$ | $n_{d3} = 1.69895$ | $v_{d3} = 30.13$ |
| $r_5 = 9.632$ | $d_5 = 3.74$ | $n_{d4} = 1.48749$ | $v_{d4} = 70.23$ |
| $r_6 = -630.252$ | $d_6 = 1.57$ | | |
| $r_7 = 24.336$ (Aspheric) | $d_7 = 3.30$ | $n_{d5} = 1.58313$ | $v_{d5} = 59.38$ |
| $r_8 = -21.149$ (Aspheric) | $d_8 = 1.00$ | | |
| $r_9 = \infty$ (Stop) | $d_9 = $ (Variable) | | |
| $r_{10} = -35.853$ (Aspheric) | $d_{10} = 1.90$ | $n_{d6} = 1.52542$ | $v_{d6} = 55.80$ |
| $r_{11} = -39.426$ | $d_{11} = 0.30$ | | |
| $r_{12} = -52.711$ | $d_{12} = 2.20$ | $n_{d7} = 1.64769$ | $v_{d7} = 33.79$ |
| $r_{13} = -25.938$ | $d_{13} = 4.60$ | | |
| $r_{14} = -10.580$ | $d_{14} = 1.50$ | $n_{d8} = 1.74100$ | $v_{d8} = 52.64$ |
| $r_{15} = -69.725$ | | | |

Aspherical Coefficients

7th surface $K = 0.000$
$A_4 = -5.00484 \times 10^{-5}$
$A_6 = 1.91018 \times 10^{-6}$
$A_8 = -6.31226 \times 10^{-8}$
$A_{10} = 7.71051 \times 10^{-10}$ 8th surface $K = 0.000$
$A_4 = 1.65332 \times 10^{-5}$
$A_6 = 1.70742 \times 10^{-6}$
$A_8 = -4.49943 \times 10^{-8}$
$A_{10} = 3.31590 \times 10^{-10}$ 10th surface $K = -20.405$
$A_4 = -1.70899 \times 10^{-6}$
$A_6 = 5.03253 \times 10^{-7}$
$A_8 = -5.57267 \times 10^{-11}$
$A_{10} = 2.83563 \times 10^{-11}$ Zooming Data (∞)

|  | WE | ST | TE |
|---|---|---|---|
| f (mm) | 29.042 | 55.721 | 106.286 |
| $F_{NO}$ | 4.96 | 8.20 | 13.60 |
| 2ω (°) | 73.35 | 40.37 | 20.37 |
| FB (mm) | 6.44 | 33.16 | 83.81 |
| $d_9$ | 13.47 | 5.50 | 1.37 |

(Example 4)

| $r_1 = -17.817$ | $d_1 = 1.30$ | $n_{d1} = 1.80400$ | $v_{d1} = 46.57$ |
| $r_2 = 9.854$ | $d_2 = 4.33$ | $n_{d2} = 1.70154$ | $v_{d2} = 41.24$ |
| $r_3 = -140.027$ | $d_3 = 0.20$ | | |
| $r_4 = 16.159$ | $d_4 = 1.30$ | $n_{d3} = 1.69895$ | $v_{d3} = 30.13$ |
| $r_5 = 10.451$ | $d_5 = 3.73$ | $n_{d4} = 1.48749$ | $v_{d4} = 70.23$ |
| $r_6 = -115.408$ | $d_6 = 1.81$ | | |
| $r_7 = 22.554$ (Aspheric) | $d_7 = 3.69$ | $n_{d5} = 1.58313$ | $v_{d5} = 59.46$ |
| $r_8 = -23.660$ (Aspheric) | $d_8 = 0.95$ | | |
| $r_9 = \infty$ (Stop) | $d_9 = $ (Variable) | | |
| $r_{10} = -63.591$ (Aspheric) | $d_{10} = 1.80$ | $n_{d6} = 1.52542$ | $v_{d6} = 55.78$ |
| $r_{11} = -70.359$ | $d_{11} = 0.60$ | | |
| $r_{12} = -70.359$ | $d_{12} = 2.60$ | $n_{d7} = 1.64769$ | $v_{d7} = 33.79$ |
| $r_{13} = -27.718$ | $d_{13} = 3.80$ | | |
| $r_{14} = -10.612$ | $d_{14} = 1.52$ | $n_{d8} = 1.74100$ | $v_{d8} = 52.64$ |
| $r_{15} = -110.575$ | | | |

Aspherical Coefficients

7th surface $K = 0.000$
$A_4 = 6.28265 \times 10^{-6}$
$A_6 = 1.22448 \times 10^{-6}$
$A_8 = 1.72332 \times 10^{-8}$
$A_{10} = -3.54339 \times 10^{-10}$ 8th surface $K = 0.000$
$A_4 = 6.27147 \times 10^{-5}$
$A_6 = 1.41073 \times 10^{-6}$
$A_8 = 4.72045 \times 10^{-9}$
$A_{10} = -1.35198 \times 10^{-10}$ 10th surface $K = 7.725$
$A_4 = 7.38622 \times 10^{-5}$
$A_6 = -2.55344 \times 10^{-7}$
$A_8 = 7.82592 \times 10^{-9}$
$A_{10} = -1.37482 \times 10^{-11}$ -continued

| Zooming Data (∞) | | | |
|---|---|---|---|
| | WE | ST | TE |
| f (mm) | 29.016 | 59.372 | 120.908 |
| $F_{NO}$ | 5.79 | 9.46 | 15.45 |
| 2ω (°) | 73.35 | 40.37 | 20.37 |
| FB (mm) | 6.62 | 36.18 | 96.09 |
| $d_9$ | 13.14 | 5.00 | 1.04 |

(Example 5)

$r_1 = -16.974$   $d_1 = 2.00$   $n_{d1} = 1.80400$   $v_{d1} = 46.57$
$r_2 = 11.536$   $d_2 = 4.04$   $n_{d2} = 1.70154$   $v_{d2} = 41.24$
$r_3 = -85.814$   $d_3 = 0.20$
$r_4 = 16.721$   $d_4 = 1.50$   $n_{d3} = 1.69895$   $v_{d3} = 30.13$
$r_5 = 10.591$   $d_5 = 3.65$   $n_{d4} = 1.48749$   $v_{d4} = 70.23$
$r_6 = -171.561$   $d_6 = 1.44$
$r_7 = 24.827$   $d_7 = 3.32$   $n_{d5} = 1.58313$   $v_{d5} = 59.38$
$r_8 = -21.646$ (Aspheric)   $d_8 = 1.00$
$r_9 = ∞$ (Stop)   $d_9 =$ (Variable)
$r_{10} = -31.693$ (Aspheric)   $d_{10} = 1.90$   $n_{d6} = 1.52542$   $v_{d6} = 55.80$
$r_{11} = -34.642$   $d_{11} = 0.20$
$r_{12} = -52.288$   $d_{12} = 2.20$   $n_{d7} = 1.63980$   $v_{d7} = 34.46$
$r_{13} = -26.183$   $d_{13} = 4.60$
$r_{14} = -10.580$   $d_{14} = 1.60$   $n_{d8} = 1.74100$   $v_{d8} = 52.64$
$r_{15} = -68.737$ Aspherical Coefficients 8th surface $K = 0.000$
$A_4 = 4.98676 \times 10^{-5}$
$A_6 = 2.77166 \times 10^{-7}$
$A_8 = -1.09047 \times 10^{-8}$
$A_{10} = 8.59224 \times 10^{-11}$ 10th surface $K = -11.373$
$A_4 = 1.12656 \times 10^{-5}$
$A_6 = 8.20170 \times 10^{-8}$
$A_8 = 1.04489 \times 10^{-8}$
$A_{10} = -4.67672 \times 10^{-11}$

| Zooming Data (∞) | | | |
|---|---|---|---|
| | WE | ST | TE |
| f (mm) | 29.007 | 54.152 | 101.535 |
| $F_{NO}$ | 4.96 | 8.00 | 13.00 |
| 2ω (°) | 74.77 | 44.23 | 24.23 |
| FB (mm) | 6.48 | 31.66 | 79.09 |
| $d_9$ | 13.26 | 5.70 | 1.63 |

(Example 6)

$r_1 = -16.942$   $d_1 = 1.50$   $n_{d1} = 1.80400$   $v_{d1} = 46.57$
$r_2 = 10.774$   $d_2 = 4.01$   $n_{d2} = 1.72342$   $v_{d2} = 37.95$
$r_3 = -16635.070$   $d_3 = 0.30$
$r_4 = 13.182$   $d_4 = 1.50$   $n_{d3} = 1.72151$   $v_{d3} = 29.23$
$r_5 = 8.549$   $d_5 = 4.32$   $n_{d4} = 1.48749$   $v_{d4} = 70.23$
$r_6 = -801.844$   $d_6 = 1.68$
$r_7 = 21.885$ (Aspheric)   $d_7 = 3.20$   $n_{d5} = 1.58313$   $v_{d5} = 59.38$
$r_8 = -20.473$ (Aspheric)   $d_8 = 1.00$
$r_9 = ∞$ (Stop)   $d_9 =$ (Variable)
$r_{10} = -42.000$ (Aspheric)   $d_{10} = 2.30$   $n_{d6} = 1.58423$   $v_{d6} = 30.50$
$r_{11} = -24.113$   $d_{11} = 5.22$
$r_{12} = -10.325$   $d_{12} = 1.50$   $n_{d7} = 1.71300$   $v_{d7} = 53.87$
$r_{13} = -116.271$ Aspherical Coefficients 7th surface $K = 0.000$
$A_4 = -8.02446 \times 10^{-5}$
$A_6 = 8.17849 \times 10^{-8}$
$A_8 = -3.05497 \times 10^{-9}$
$A_{10} = -8.45690 \times 10^{-10}$ -continued 8th surface $K = 0.000$
$A_4 = 1.76606 \times 10^{-6}$
$A_6 = 1.97215 \times 10^{-7}$
$A_8 = -2.40647 \times 10^{-8}$
$A_{10} = -3.95332 \times 10^{-10}$ 10th surface $K = -26.024$
$A_4 = 6.31504 \times 10^{-6}$
$A_6 = 3.72531 \times 10^{-8}$
$A_8 = 5.03778 \times 10^{-9}$
$A_{10} = 2.01988 \times 10^{-12}$

| Zooming Data (∞) | | | |
|---|---|---|---|
| | WE | ST | TE |
| f (mm) | 28.893 | 53.089 | 96.800 |
| $F_{NO}$ | 4.96 | 7.80 | 12.40 |
| 2ω (°) | 75.09 | 44.99 | 25.37 |
| FB (mm) | 7.53 | 30.96 | 73.27 |
| $d_9$ | 12.14 | 5.50 | 1.92 |

(Example 7)

$r_1 = -19.792$   $d_1 = 2.95$   $n_{d1} = 1.78800$   $v_{d1} = 47.37$
$r_2 = 154.274$   $d_2 = 0.20$
$r_3 = 26.083$   $d_3 = 2.10$   $n_{d2} = 1.68893$   $v_{d2} = 31.07$
$r_4 = 1000.000$ (Aspheric)   $d_4 = 0.89$
$r_5 = -45.109$   $d_5 = 1.20$   $n_{d3} = 1.79952$   $v_{d3} = 42.22$
$r_6 = 20.596$   $d_6 = 3.75$   $n_{d4} = 1.48749$   $v_{d4} = 70.23$
$r_7 = -18.034$   $d_7 = 0.20$
$r_8 = 23.912$   $d_8 = 4.09$   $n_{d5} = 1.49700$   $v_{d5} = 81.54$
$r_9 = -15.803$   $d_9 = 1.00$
$r_{10} = ∞$ (Stop)   $d_{10} =$ (Variable)
$r_{11} = -41.963$ (Aspheric)   $d_{11} = 2.00$   $n_{d6} = 1.58423$   $v_{d6} = 30.50$
$r_{12} = -39.563$   $d_{12} = 0.20$
$r_{13} = -219.888$   $d_{13} = 2.30$   $n_{d7} = 1.62004$   $v_{d7} = 36.26$
$r_{14} = -40.138$   $d_{14} = 4.36$
$r_{15} = -10.500$   $d_{15} = 1.60$   $n_{d8} = 1.74100$   $v_{d8} = 52.64$
$r_{16} = -120.475$ Aspherical Coefficients 4th surface $K = 0.000$
$A_4 = 1.10296 \times 10^{-4}$
$A_6 = 3.72605 \times 10^{-7}$
$A_8 = 1.28947 \times 10^{-8}$
$A_{10} = -1.78291 \times 10^{-10}$ 11th surface $K = -65.113$
$A_4 = -4.41242 \times 10^{-5}$
$A_6 = 1.48121 \times 10^{-6}$
$A_8 = -1.23117 \times 10^{-8}$
$A_{10} = 8.72697 \times 10^{-11}$

| Zooming Data (∞) | | | |
|---|---|---|---|
| | WE | ST | TE |
| f (mm) | 29.008 | 56.087 | 108.548 |
| $F_{NO}$ | 4.96 | 8.20 | 13.60 |
| 2ω (°) | 73.41 | 42.66 | 22.67 |
| FB (mm) | 6.91 | 33.18 | 84.08 |
| $d_{10}$ | 13.01 | 5.40 | 1.46 |

(Example 8)

$r_1 = -19.376$   $d_1 = 2.73$   $n_{d1} = 1.78800$   $v_{d1} = 47.37$
$r_2 = 194.662$   $d_2 = 0.20$
$r_3 = 27.589$   $d_3 = 2.10$   $n_{d2} = 1.68893$   $v_{d2} = 31.07$
$r_4 = 1000.000$ (Aspheric)   $d_4 = 0.99$
$r_5 = -57.736$   $d_5 = 1.20$   $n_{d3} = 1.80610$   $v_{d3} = 40.92$
$r_6 = 22.625$   $d_6 = 3.97$   $n_{d4} = 1.49700$   $v_{d4} = 81.54$
$r_7 = -19.360$   $d_7 = 0.20$ -continued

| | | | |
|---|---|---|---|
| $r_8 = 25.498$ | $d_8 = 3.61$ | $n_{d5} = 1.48749$ | $\nu_{d5} = 70.23$ |
| $r_9 = -15.614$ | $d_9 = 1.00$ | | |
| $r_{10} = \infty$ (Stop) | $d_{10}$ = (Variable) | | |
| $r_{11} = -50.559$ (Aspheric) | $d_{11} = 2.00$ | $n_{d6} = 1.58423$ | $\nu_{d6} = 30.50$ |
| $r_{12} = -38.110$ | $d_{12} = 0.20$ | | |
| $r_{13} = -85.065$ | $d_{13} = 2.30$ | $n_{d7} = 1.57501$ | $\nu_{d7} = 41.50$ |
| $r_{14} = -38.068$ | $d_{14} = 4.37$ | | |
| $r_{15} = -10.500$ | $d_{15} = 1.60$ | $n_{d8} = 1.74100$ | $\nu_{d8} = 52.64$ |
| $r_{16} = -89.626$ | | | |

Aspherical Coefficients

4th surface $K = 0.000$
$A_4 = 1.10273 \times 10^{-4}$
$A_6 = 6.98781 \times 10^{-7}$
$A_8 = 3.49557 \times 10^{-9}$
$A_{10} = -1.03744 \times 10^{-10}$ 11th surface $K = -69.746$
$A_4 = -6.60592 \times 10^{-6}$
$A_6 = 8.24293 \times 10^{-7}$
$A_8 = -4.54726 \times 10^{-9}$
$A_{10} = 4.14010 \times 10^{-11}$

| Zooming Data ($\infty$) | | | |
|---|---|---|---|
| | WE | ST | TE |
| f (mm) | 28.929 | 59.317 | 120.775 |
| $F_{NO}$ | 4.96 | 8.76 | 15.45 |
| 2ω (°) | 74.87 | 40.59 | 20.41 |
| FB (mm) | 6.74 | 36.45 | 96.54 |
| $d_{10}$ | 13.02 | 4.85 | 0.89 |

(Example 9)

| | | | |
|---|---|---|---|
| $r_1 = -16.529$ | $d_1 = 2.50$ | $n_{d1} = 1.78800$ | $\nu_{d1} = 47.37$ |
| $r_2 = -371.916$ | $d_2 = 0.20$ | | |
| $r_3 = 23.006$ | $d_3 = 2.28$ | $n_{d2} = 1.66680$ | $\nu_{d2} = 33.05$ |
| $r_4 = 1092733.714$ | $d_4 = 0.71$ | | |
| $r_5 = -36.507$ | $d_5 = 1.20$ | $n_{d3} = 1.80610$ | $\nu_{d3} = 40.92$ |
| $r_6 = 19.717$ | $d_6 = 3.46$ | $n_{d4} = 1.49700$ | $\nu_{d4} = 81.54$ |
| $r_7 = -21.069$ | $d_7 = 0.20$ | | |
| $r_8 = 15.991$ (Aspheric) | $d_8 = 4.77$ | $n_{d5} = 1.51633$ | $\nu_{d5} = 64.14$ |
| $r_9 = -20.058$ (Aspheric) | $d_9 = 1.00$ | | |
| $r_{10} = \infty$ (Stop) | $d_{10}$ = (Variable) | | |
| $r_{11} = -46.074$ (Aspheric) | $d_{11} = 2.00$ | $n_{d6} = 1.58423$ | $\nu_{d6} = 30.50$ |
| $r_{12} = -37.156$ | $d_{12} = 0.20$ | | |
| $r_{13} = -59.125$ | $d_{13} = 2.30$ | $n_{d7} = 1.58144$ | $\nu_{d7} = 40.75$ |
| $r_{14} = -27.910$ | $d_{14} = 3.91$ | | |
| $r_{15} = -10.500$ | $d_{15} = 1.60$ | $n_{d8} = 1.74100$ | $\nu_{d8} = 52.64$ |
| $r_{16} = -116.877$ | | | |

Aspherical Coefficients

8th surface $K = 0.000$
$A_4 = -2.18073 \times 10^{-5}$
$A_6 = -4.94959 \times 10^{-7}$
$A_8 = -3.35535 \times 10^{-10}$
$A_{10} = -5.46022 \times 10^{-12}$ 9th surface $K = 0.000$
$A_4 = 8.07402 \times 10^{-5}$
$A_6 = -1.15155 \times 10^{-6}$
$A_8 = 8.49111 \times 10^{-9}$
$A_{10} = 3.08144 \times 10^{-11}$ 11th surface $K = -116.957$
$A_4 = -7.11936 \times 10^{-5}$
$A_6 = 1.77682 \times 10^{-6}$
$A_8 = -1.31526 \times 10^{-8}$
$A_{10} = 8.48030 \times 10^{-11}$

| Zooming Data ($\infty$) | | | |
|---|---|---|---|
| | WE | ST | TE |
| f (mm) | 29.019 | 55.013 | 101.492 |
| $F_{NO}$ | 4.96 | 8.00 | 12.80 |
| 2ω (°) | 73.19 | 43.41 | 24.21 |
| FB (mm) | 6.56 | 31.74 | 76.77 |
| $d_{10}$ | 13.15 | 5.60 | 1.74 |

(Example 10)

| | | | |
|---|---|---|---|
| $r_1 = -16.301$ | $d_1 = 1.94$ | $n_{d1} = 1.78800$ | $\nu_{d1} = 47.37$ |
| $r_2 = -100.083$ | $d_2 = 0.20$ | | |
| $r_3 = 29.651$ | $d_3 = 2.17$ | $n_{d2} = 1.72151$ | $\nu_{d2} = 29.23$ |
| $r_4 = -130957.022$ | $d_4 = 0.95$ | | |
| $r_5 = -31.083$ | $d_5 = 1.20$ | $n_{d3} = 1.79952$ | $\nu_{d3} = 42.22$ |
| $r_6 = 19.440$ | $d_6 = 3.46$ | $n_{d4} = 1.48749$ | $\nu_{d4} = 70.23$ |
| $r_7 = -19.440$ | $d_7 = 0.20$ | | |
| $r_8 = 15.317$ (Aspheric) | $d_8 = 4.70$ | $n_{d5} = 1.49700$ | $\nu_{d5} = 81.54$ |
| $r_9 = -18.249$ (Aspheric) | $d_9 = 1.00$ | | |
| $r_{10} = \infty$ (Stop) | $d_{10}$ = (Variable) | | |
| $r_{11} = -40.0064$ (Aspheric) | $d_{11} = 2.00$ | $n_{d6} = 1.58423$ | $\nu_{d6} = 30.50$ |
| $r_{12} = -36.8826$ | $d_{12} = 0.20$ | | |
| $r_{13} = -65.4235$ | $d_{13} = 2.30$ | $n_{d7} = 1.63980$ | $\nu_{d7} = 34.46$ |
| $r_{14} = -26.0360$ | $d_{14} = 3.75$ | | |
| $r_{15} = -10.5000$ | $d_{15} = 1.60$ | $n_{d8} = 1.74100$ | $\nu_{d8} = 52.64$ |
| $r_{16} = -155.5367$ | | | |

Aspherical Coefficients

8th surface $K = 0.000$
$A_4 = -1.80046 \times 10^{-5}$
$A_6 = -5.21450 \times 10^{-7}$
$A_8 = 1.00580 \times 10^{-9}$
$A_{10} = -1.30988 \times 10^{-11}$ 9th surface $K = 0.000$
$A_4 = 8.77645 \times 10^{-5}$
$A_6 = -8.79279 \times 10^{-7}$
$A_8 = -6.49028 \times 10^{-9}$
$A_{10} = 3.37692 \times 10^{-10}$ 11th surface $K = -85.165$
$A_4 = -8.18399 \times 10^{-5}$
$A_6 = 1.85051 \times 10^{-6}$
$A_8 = -1.24104 \times 10^{-8}$
$A_{10} = 7.95550 \times 10^{-11}$

| Zooming Data ($\infty$) | | | |
|---|---|---|---|
| | WE | ST | TE |
| f (mm) | 28.989 | 55.967 | 108.458 |
| $F_{NO}$ | 4.96 | 8.20 | 13.60 |
| 2ω (°) | 73.02 | 42.76 | 22.69 |
| FB (mm) | 6.75 | 33.32 | 85.01 |
| $d_{10}$ | 13.31 | 5.50 | 1.44 |

(Example 11)

| | | | |
|---|---|---|---|
| $r_1 = -20.316$ | $d_1 = 1.41$ | $n_{d1} = 1.80400$ | $\nu_{d1} = 46.57$ |
| $r_2 = 1210.168$ | $d_2 = 0.20$ | | |
| $r_3 = 37.277$ | $d_3 = 2.00$ | $n_{d2} = 1.58423$ | $\nu_{d2} = 30.49$ |
| $r_4 = 78.092$ (Aspheric) | $d_4 = 0.98$ | | |
| $r_5 = -107.095$ | $d_5 = 1.20$ | $n_{d3} = 1.80400$ | $\nu_{d3} = 46.57$ |
| $r_6 = 35.696$ | $d_6 = 4.25$ | $n_{d4} = 1.48749$ | $\nu_{d4} = 70.23$ |
| $r_7 = -19.642$ | $d_7 = 0.20$ | | |
| $r_8 = 27.082$ | $d_8 = 4.46$ | $n_{d5} = 1.49700$ | $\nu_{d5} = 81.54$ |
| $r_9 = -15.325$ | $d_9 = 1.00$ | | |
| $r_{10} = \infty$ (Stop) | $d_{10}$ = (Variable) | | |
| $r_{11} = -40.229$ (Aspheric) | $d_{11} = 2.00$ | $n_{d6} = 1.58423$ | $\nu_{d6} = 30.49$ |
| $r_{12} = -39.604$ | $d_{12} = 0.20$ | | |
| $r_{13} = -229.338$ | $d_{13} = 2.30$ | $n_{d7} = 1.54814$ | $\nu_{d7} = 45.79$ |
| $r_{14} = -34.679$ | $d_{14} = 4.26$ | | |

-continued

| $r_{15} = -10.500$ | $d_{15} = 1.60$ | $n_{d8} = 1.74100$ | $v_{d8} = 52.64$ |
| $r_{16} = -99.999$ | | | |

Aspherical Coefficients

4th surface $K = -4.668$
$A_4 = 1.44620 \times 10^{-4}$
$A_6 = 6.61037 \times 10^{-7}$
$A_8 = 1.17448 \times 10^{-8}$
$A_{10} = -1.23594 \times 10^{-10}$ 11th surface $K = -52.948$
$A_4 = -3.73259 \times 10^{-5}$
$A_6 = 1.30497 \times 10^{-6}$
$A_8 = -1.00828 \times 10^{-8}$
$A_{10} = 7.86467 \times 10^{-11}$ Zooming Data (∞)

| | WE | ST | TE |
|---|---|---|---|
| f (mm) | 28.981 | 56.145 | 108.284 |
| $F_{NO}$ | 4.96 | 8.20 | 13.60 |
| 2ω (°) | 73.61 | 42.68 | 22.73 |
| FB (mm) | 6.75 | 33.62 | 85.18 |
| $d_{10}$ | 13.44 | 5.50 | 1.42 |

(Example 12)

| $r_1 = -19.859$ | $d_1 = 1.60$ | $n_{d1} = 1.80400$ | $v_{d1} = 46.57$ |
| $r_2 = 312.909$ | $d_2 = 0.20$ | | |
| $r_3 = 32.995$ | $d_3 = 2.00$ | $n_{d2} = 1.58423$ | $v_{d2} = 30.50$ |
| $r_4 = 74.210$ (Aspheric) | $d_4 = 0.99$ | | |
| $r_5 = -92.564$ | $d_5 = 1.20$ | $n_{d3} = 1.80400$ | $v_{d3} = 46.57$ |
| $r_6 = 33.249$ | $d_6 = 3.75$ | $n_{d4} = 1.48749$ | $v_{d4} = 70.23$ |
| $r_7 = -18.216$ | $d_7 = 0.20$ | | |
| $r_8 = 25.563$ | $d_8 = 5.08$ | $n_{d5} = 1.49700$ | $v_{d5} = 81.54$ |
| $r_9 = -15.464$ | $d_9 = 1.00$ | | |
| $r_{10} = \infty$ (Stop) | $d_{10}$ = (Variable) | | |
| $r_{11} = -41.395$ (Aspheric) | $d_{11} = 2.00$ | $n_{d6} = 1.58423$ | $v_{d6} = 30.50$ |

-continued

| $r_{12} = -35.088$ | $d_{12} = 0.20$ | | |
| $r_{13} = -136.686$ | $d_{13} = 2.30$ | $n_{d7} = 1.54072$ | $v_{d7} = 47.23$ |
| $r_{14} = -37.701$ | $d_{14} = 4.29$ | | |

-continued

| $r_{15} = -10.500$ | $d_{15} = 1.60$ | $n_{d8} = 1.74100$ | $v_{d8} = 52.64$ |
| $r_{16} = -95.688$ | | | |

Aspherical Coefficients

4th surface $K = -6.966$
$A_4 = 1.40718 \times 10^{-4}$
$A_6 = 6.67089 \times 10^{-7}$
$A_8 = 1.02577 \times 10^{-8}$
$A_{10} = -1.44753 \times 10^{-10}$ 11th surface $K = -60.073$
$A_4 = -4.22058 \times 10^{-5}$
$A_6 = 1.39433 \times 10^{-6}$
$A_8 = -1.11409 \times 10^{-8}$
$A_{10} = 7.73288 \times 10^{-11}$ Zooming Data (∞)

| | WE | ST | TE |
|---|---|---|---|
| f (mm) | 29.039 | 59.482 | 120.845 |
| $F_{NO}$ | 4.96 | 8.76 | 15.45 |
| 2ω (°) | 73.52 | 40.44 | 20.40 |
| FB (mm) | 6.77 | 36.63 | 96.81 |
| $d_{10}$ | 13.28 | 5.00 | 0.99 |

FIGS. 7 to 12 are aberration diagrams for Examples 1, 5–7, 9 and 11 upon focused on an infinite object point. Shown in these aberration diagrams are spherical aberration SA, astigmatism AS, distortion DT and chromatic aberration of magnification CC at the wide-angle end (a), in the standard state (b) and at the telephoto end (c), respectively. "FIY" in the diagrams represents an image height.

Enumerated below are the values of conditions (1) to 11) in the examples.

| | | | | | | Conditions | | | | | |
|---|---|---|---|---|---|---|---|---|---|---|---|
| | | | | | | (6) | | | | | |
| Ex. | (1) | (2) | (3) | (4) | (5) | OS | IPS | (7) | (8) | (9) | (10) | (11) |
| 1 | 0.60 | 1.09 | 0.60 | 1.07 | 40.1 | $2.35 \times 10^{-4}$ | $2.27 \times 10^{-3}$ | — | — | — | — | — |
| 2 | 0.61 | 1.09 | 0.61 | 1.05 | 40.1 | $3.34 \times 10^{-5}$ | $2.25 \times 10^{-3}$ | — | — | — | — | — |
| 3 | 0.63 | 1.16 | 0.63 | 1.10 | 40.1 | $1.48 \times 10^{-3}$ | $1.47 \times 10^{-3}$ | — | — | — | — | — |
| 4 | 0.60 | 1.09 | 0.60 | 1.07 | 40.1 | $1.17 \times 10^{-3}$ | $3.69 \times 10^{-3}$ | — | — | — | — | — |
| 5 | 0.55 | 1.02 | 0.55 | 1.07 | 40.1 | — | $2.29 \times 10^{-3}$ | — | — | — | — | — |
| 6 | 0.61 | 1.15 | 0.61 | 1.12 | 41.0 | $3.76 \times 10^{-3}$ | $8.53 \times 10^{-5}$ | — | — | — | — | — |
| 7 | — | — | — | — | — | — | — | 0.98 | −0.07 | — | — | — |
| 8 | — | — | — | — | — | — | — | 0.98 | 0.00 | — | — | — |
| 9 | — | — | — | — | — | — | — | 0.87 | −0.31 | — | — | — |
| 10 | — | — | — | — | — | — | — | 0.99 | −0.26 | — | — | — |
| 11 | — | — | — | — | — | — | — | — | — | $5.63 \times 10^{-3}$ | 0.18 | 0.21 |
| 12 | — | — | — | — | — | — | — | — | — | $5.63 \times 10^{-3}$ | 0.22 | 0.22 |

OS: object side
IPS: image plane side

Figure 13:
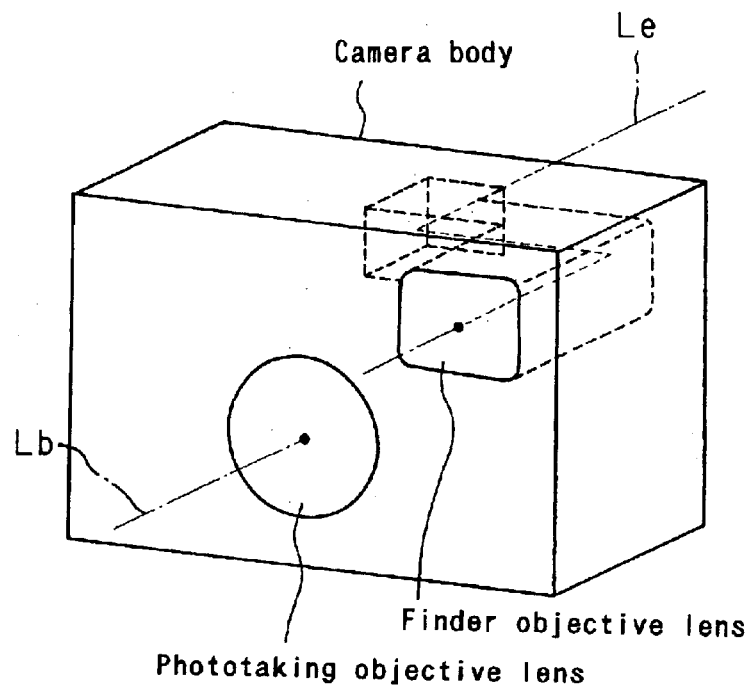
FIG. 13 is a perspective view illustrative in schematic of the construction of a compact camera with which the zoom optical system of the invention is used.
Figure 14:
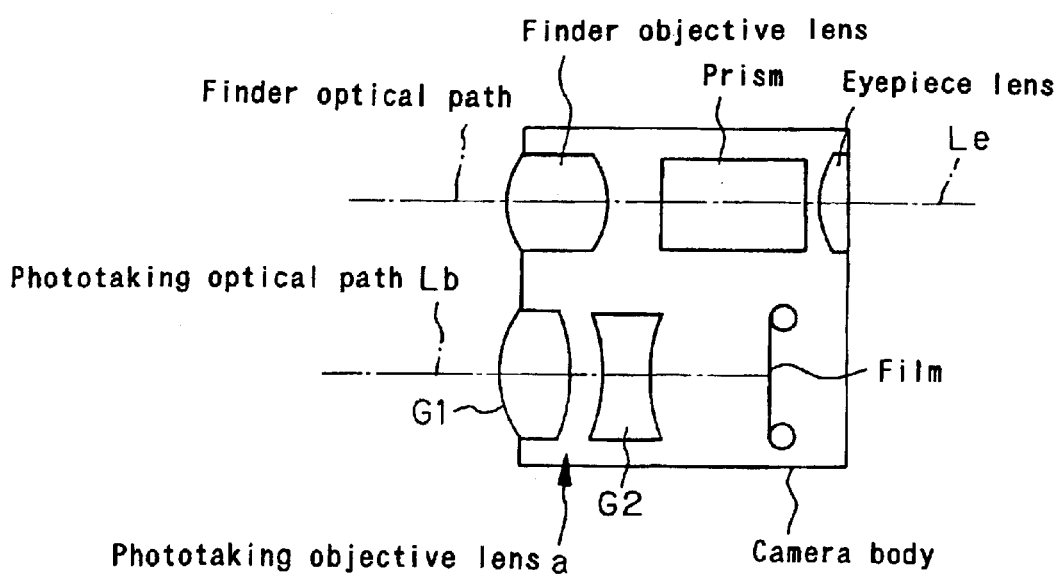
FIG. 14 is a sectional view illustrative in schematic of the construction of the compact camera shown in FIG. 13.

The zoom optical system of the invention as described above may be used in the form of a phototaking objective lens a for a compact camera constructed as shown in FIG. 13 that is a schematic perspective view of the camera and FIG. 14 that is a schematic sectional view of the same. Here, G1 is the first lens group having positive refracting power and G2 is the second lens group having negative refracting power. In FIGS. 13 and 14, Lb is a phototaking optical path and Le is a finder optical path. The phototaking optical path Lb is parallel with the finder optical path Le. The image of a subject is observed through a finder comprising a finder objective lens, a prism, a stop and an eyepiece lens, and formed on a film by the phototaking objective lens a.

The inventive zoom optical system may also be used in the form of a phototaking objective lens for a compact electronic camera using an image pickup device such as a CCD instead of a film.

FIGS. 15 and 16 show an example of the finder used on such a compact camera as illustrated in FIGS. 13 and 14. FIG. 15 is a horizontal section of the finder in the telephoto end state, and FIGS. 16(a) to 16(c) are exploded views for the optical path at the wide-angle end (a), in the standard state (b) and at the telephoto end (c). In these figures, Ob is a finder optical path, P is a prism, Oc is an eyepiece lens, and EP is an eye point. Set out below are numerical data on this example of finder with "2ω" standing for the angle of view and "$M_f$" indicating a finder magnification.

$r_1 = 46.0613$    $d_1 = 0.900$    $n_{d1} = 1.58423$    $v_{d1} = 30.49$
$r_2 = 5.9928$ (Aspheric)    $d_2 = $ (Variable)
$r_3 = 5.3248$ (Aspheric)    $d_3 = 2.878$    $n_{d2} = 1.52542$    $v_{d2} = 55.78$
$r_4 = -12.2914$    $d_4 = $ (Variable)
$r_5 = -4.4921$ (Aspheric)    $d_5 = 0.790$    $n_{d3} = 1.58425$    $v_{d3} = 30.35$
$r_6 = 5.6481$ (Aspheric)    $d_6 = $ (Variable)
$r_7 = 5.6914$ (Aspheric)    $d_7 = 3.357$    $n_{d4} = 1.52542$    $v_{d4} = 55.78$
$r_8 = -5.8372$ (Aspheric)    $d_8 = 0.350$
$r_9 = \infty$    $d_9 = 14.580$    $n_{d5} = 1.52542$    $v_{d5} = 55.78$
$r_{10} = \infty$    $d_{10} = 1.000$
$r_{11} = \infty$ (Stop)    $d_{11} = 0.000$
$r_{12} = 20.4383$    $d_{12} = 25.250$    $n_{d6} = 1.52542$    $v_{d6} = 55.78$
$r_{13} = \infty$    $d_{13} = 1.300$
$r_{14} = 14.5444$ (Aspheric)    $d_{14} = 2.000$    $n_{d7} = 1.52542$    $v_{d7} = 55.78$
$r_{15} = -28.5812$    $d_{15} = 15.500$
$r_{16} = \infty$ (EP)

Aspherical Coefficients

2nd surface $K = -1.2544$
$A_4 = -2.7864 \times 10^{-4}$
$A_6 = -3.3439 \times 10^{-5}$
$A_8 = 3.7003 \times 10^{-6}$
$A_{10} = -1.2232 \times 10^{-7}$ 3rd surface $K = -1.0212$
$A_4 = -7.2871 \times 10^{-4}$
$A_6 = -6.0011 \times 10^{-6}$
$A_8 = 4.5456 \times 10^{-7}$
$A_{10} = 0$ 5th surface $K = -3.2170$
$A_4 = -2.1303 \times 10^{-3}$
$A_6 = 3.6596 \times 10^{-4}$
$A_8 = -1.1481 \times 10^{-5}$
$A_{10} = 0$ 6th surface $K = -0.6786$
$A_4 = -1.8282 \times 10^{-3}$
$A_6 = 1.8710 \times 10^{-4}$
$A_8 = -6.7564 \times 10^{-6}$
$A_{10} = 0$ 7th surface $K = -0.4923$
$A_4 = -1.5482 \times 10^{-3}$
$A_6 = 4.1086 \times 10^{-5}$
$A_8 = 3.5723 \times 10^{-6}$
$A_{10} = -1.5406 \times 10^{-7}$ -continued 8th surface $K = -0.8305$
$A_4 = 7.4053 \times 10^{-4}$
$A_6 = 1.2446 \times 10^{-6}$
$A_8 = 2.7527 \times 10^{-6}$
$A_{10} = 2.2476 \times 10^{-8}$ 14th surface $K = 0.0000$
$A_4 = -9.5530 \times 10^{-5}$
$A_6 = 9.3908 \times 10^{-7}$
$A_8 = -5.5535 \times 10^{-8}$
$A_{10} = 0$ Zooming Data

|  | WE | ST | TE |
|---|---|---|---|
| Object Distance | 3000 | 3000 | 3000 |
| $d_2$ | 5.560 | 2.848 | 0.800 |
| $d_4$ | 0.800 | 4.773 | 8.725 |
| $d_6$ | 3.965 | 2.704 | 0.800 |
| 2ω | 64.8° | 32.1° | 16.4° |
| $M_f$ | 0.3 | 0.59 | 1.17 |

Figure 17A:
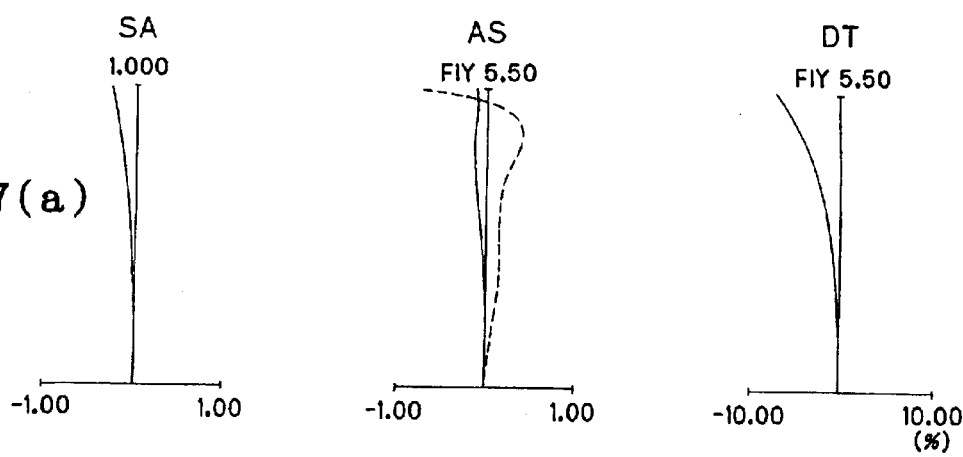
FIGS. 17(a) to 17(c) are aberration diagrams for the finder of FIG. 15.
Figure 17B:
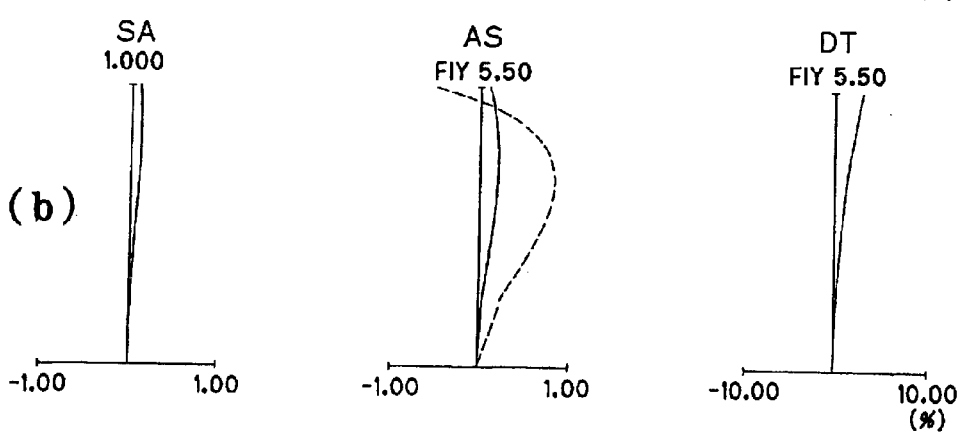
Figure 17C:
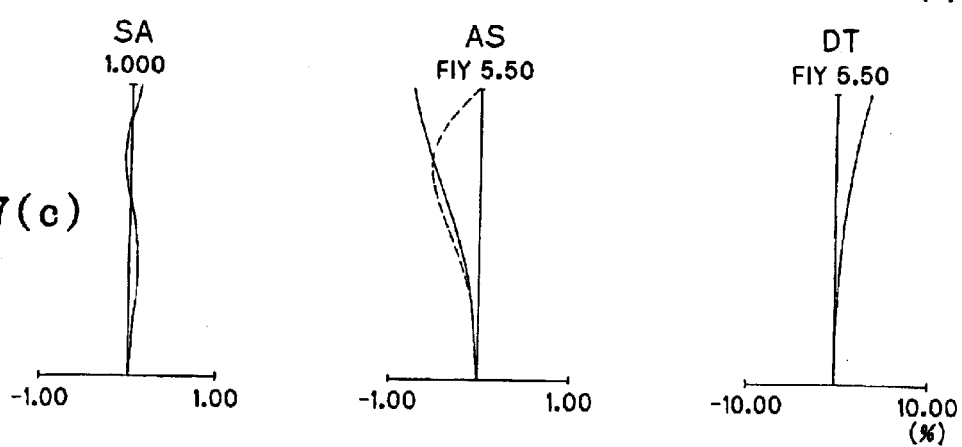

FIGS. 17(a) to 17(c) are aberration diagrams for the aforesaid example of finder, in which spherical aberration SA, astigmatism AS and distortion DT at the wide-angle end (a), in the standard state (b) and at the telephoto end (c) are shown.

According to the invention as described above, a wide-angle yet high-zoom-ratio zoom optical system can be achieved. In particular, it is possible to achieve a compact two-group zoom lens system that maintains satisfactory image-formation capability all over the zoom range while achieving a zoom ratio of 3 or greater.

We claim:

1. A zoom lens optical system having a zoom ratio of 3 or greater and comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

said first lens group consists of, in order from an object side thereof, a first lens component (U1) that has negative refracting power and in which a surface located nearest to an object side thereof is concave on the object side, a second lens component (U2) having positive refracting power, a third lens component (U3) having negative or positive refracting power and a fourth lens component (U4) having positive refracting power, wherein the respective lens components in the first lens group consist of a single lens or a doublet and satisfy the following conditions:

$$0.5 < |f_{G1}/f_{11}| < 3 \quad (7)$$

$$0.4 < f_{G1}/f_{13} < 0.1 \quad (8)$$

where $f_{G1}$ is a focal length of the first lens group, $f_{11}$ is a focal length of the first lens component, and $f_{13}$ is a focal length of the third lens component.

2. The zoom optical system according to claim 1, wherein at least one surface of the second or fourth lens component in the first lens group is defined by an aspheric surface.

3. A camera which uses a zoom optical system as recited in claim 1 as a phototaking lens and comprises a finder disposed on an optical path different from an optical path for said zoom optical system for observing a phototaking range defined by said phototaking lens.

4. A zoom lens optical system comprising, in order from an object side thereof, a first lens group having positive refracting power and a second lens group having negative refracting power in which, for zooming from a wide-angle end to a telephoto end of the zoom lens optical system, the respective lens groups move toward the object side with a decreasing spacing between the first lens group and the second lens group, wherein:

said first lens group consists of, in order from an object side thereof, a first lens component (U1) that has negative refracting power and in which a surface located nearest to an object side thereof is concave on the object side, a second lens component (U2) that has positive refracting power and is in a meniscus form convex on an object side thereof, a third lens component (U3) that is a doublet consisting of a negative lens and a positive lens in order from an object side thereof and has negative or positive refracting power and a fourth lens component (U4) having positive refracting power.

5. The zoom optical system according to claim 1 or 4, which has an angle of view of 70° or greater at the wide-angle end.

6. A camera which uses a zoom optical system as recited in claim 4 as a phototaking lens and comprises a finder disposed on an optical path different from an optical path for said zoom optical system for observing a phototaking range defined by said phototaking lens.

7. A zoom optical system, comprising, in order from an object side thereof, a first lens group having positive refracting power, and a second lens group having negative refracting power, in which upon zooming from a wide-angle end to a telephoto end of the zoom lens, the first and second lens groups move toward the object side while a spacing therebetween becomes narrow, wherein:

only the first and second lens groups define lens groups having positive or negative refracting power, and the first lens group consists of, in order from an object side thereof, a first lens component (U1) having negative refracting power with a surface nearest to an object side thereof being concave on the object side, a second lens component (U2) that has positive refracting power and is convex on an object side thereof, a third lens component (U3) composed of a doublet consisting of, in order from an object side thereof, a negative lens element and a positive lens element, and a fourth lens component (U4) having positive refracting power, wherein the first lens component (U1) in the first lens group is a single lens element in a meniscus form concave on an object side thereof.

8. The zoom optical system according to claim 7, wherein the second lens component (U2) in the first lens group is a single lens element in which an absolute value of a radius of curvature of a convex surface on an object side thereof is smaller than an absolute value of curvature of a surface on an image side thereof.

9. The zoom optical system according to claim 7, wherein the doublet that is the third lens component (U3) in the first lens group is a doublet in which a double-concave negative lens element and a double-convex positive lens element are cemented together.

10. The zoom optical system according to claim 7, wherein the fourth lens component (U4) in the first lens group is a single lens element in a double-convex form.

11. A camera, in which a zoom optical system as recited in claim 7 is used as a phototaking lens and which comprises a finder located on an optical path different from that for the zoom optical system for visually identifying a phototaking range by the phototaking lens.

12. A zoom optical system, comprising, in order from an object side thereof, a first lens group having positive refracting power, and a second lens group having negative refracting power, in which upon zooming from a wide-angle end to a telephoto end of the zoom lens, the first and second lens groups move toward the object side while a spacing therebetween becomes narrow, wherein:

only the first and second lens groups define lens groups having positive or negative refracting power, and the first lens group consists of, in order from an object side thereof, a first lens component (U1) having negative refracting power with a surface nearest to an object side thereof being concave on the object side, a second lens component (U2) that has positive refracting power and is convex on an object side thereof, a third lens component (U3) composed of a doublet consisting of, in order from an object side thereof, a negative lens element and a positive lens element, and a fourth lens component (U4) having positive refracting power, wherein:

the first lens component (U1) in the first lens group is a single lens element in a meniscus form that is concave on an object side thereof, the second lens component (U2) in the first lens group is a single lens element in which an absolute value of a radius of curvature of a convex surface on an object side thereof is smaller than that of a surface on an image side thereof, the doublet that is the third lens component (U3) in the first lens group is a doublet in which a double-concave negative lens element and a double-convex positive lens element are cemented together, and the fourth lens component (U4) in the first lens group is a single lens element in a double-convex form.

13. The zoom optical system according to claim 7 or 12, wherein a stop is interposed between the first lens group and the second lens group.

14. The zoom optical system according to claim 7 or 12, wherein the second lens group comprises a positive meniscus lens component convex on an image side thereof and a negative meniscus lens component convex on an image side thereof.

15. The zoom optical system according to claim 7 or 12, has an angle of view of 70° degrees or greater at the wide-angle end.

16. The zoom optical system according to claim 7 or 12, wherein the first lens group further comprises a plurality of aspheric surfaces and the second lens group further comprises an aspheric surface.

17. A camera, in which a zoom optical system as recited in claim 12 is used as a phototaking lens and which comprises a finder located on an optical path different from that for the zoom optical system for visually identifying a phototaking range by the phototaking lens.

18. A zoom optical system, comprising, in order from an object side thereof, a first lens group having positive refracting power, and a second lens group having negative refracting power, in which upon zooming from a wide-angle end to a telephoto end of the zoom lens, the first and second lens groups move toward the object side while a spacing therebetween becomes narrow, wherein:

only the first and second lens groups define lens groups having positive or negative refracting power, and the first lens group consists of, in order from an object side thereof, a first lens component (U1) having negative refracting power with a surface nearest to an object side thereof being concave on the object side, a second lens component (U2) that has positive refracting power and is convex on an object side thereof, a third lens component (U3) composed of a doublet consisting of, in order from an object side thereof, a negative lens element and a positive lens element, and a fourth lens component (U4) having positive refracting power, which has a zoom ratio of 3 or higher.

* * * * *